US00RE43903E

(19) United States
(12) Reissued Patent
Brown

(10) Patent Number: US RE43,903 E
(45) Date of Reissued Patent: Jan. 1, 2013

(54) SEVERE WEATHER DETECTOR AND ALARM

(75) Inventor: Anthony Brown, Hyattsville, MD (US)

(73) Assignee: Richmond IP Holdings, LLC, Richmond, VA (US)

(21) Appl. No.: 11/186,013

(22) Filed: Jul. 21, 2005

Related U.S. Patent Documents

Reissue of:
(64) Patent No.: 6,597,990
Issued: Jul. 22, 2003
Appl. No.: 09/546,333
Filed: Apr. 10, 2000

U.S. Applications:
(63) Continuation of application No. 09/246,784, filed on Feb. 1, 1999, now Pat. No. 6,076,044, which is a continuation of application No. 08/799,838, filed on Feb. 13, 1997, now Pat. No. 5,978,738.

(51) Int. Cl.
*G01W 1/02* (2006.01)
*G06F 19/00* (2006.01)

(52) U.S. Cl. ..... 702/3; 702/2; 342/26 R

(58) Field of Classification Search ..... 702/3, 4, 702/57, 58, 61, 65, 68, 75, 99, 104, 122, 702/130, 138, 177, 179, 188, 189, 193, 2; 455/412.2, 553.1, 555, 556.1, 557; 370/310, 370/338; 342/26 A, 26 B, 26 C, 26 D, 26 R
See application file for complete search history.

(56) References Cited

U.S. PATENT DOCUMENTS 3,326,045 A 6/1967 Vrsaljko (Continued)

FOREIGN PATENT DOCUMENTS

EP 0 622 639 11/1994

(Continued)

OTHER PUBLICATIONS

Certified translation of JP 63-204896, Schreiber Translations, Inc. pp. 1-6.*

(Continued)

*Primary Examiner* — Mohamed Charioui
(74) *Attorney, Agent, or Firm* — Banner & Witcoff, Ltd.

(57) ABSTRACT

A compact, portable weather station for predicting local extreme weather conditions and for reporting remote weather conditions. The weather station has sensors for determining local temperature, barometric pressure, humidity, ambient light, and ambient static charge. A microprocessor has memory for storing data relating to past weather conditions and data processing apparatus and algorithms for determining probable developing weather conditions responsive to sensed local conditions. The weather station has a radio receiver for communicating with global weather reporting communications systems utilizing cellular communications. Operating commands, predicted local weather conditions, and remote weather conditions are annunciated in synthesized voice in any one of a variety of predetermined languages. The weather station includes voice synthesizing and recognition apparatus for annunciating verbal prompts and weather conditions, and for responding to vocal control. The weather station is formed in two separable components, one having sensors and the other having radio communications apparatus.

REEXAMINATION RESULTS

The questions raised in reexamination proceeding No. 90/008,410, filed Jan. 5, 2007, have been considered, and the results thereof are reflected in this reissue patent which constitutes the reexamination certificate required by 35 U.S.C. 307 as provided in 37 CFR 1.570(e) for *ex parte* reexaminations, or the reexamination certificate required by 35 U.S.C. 316 as provided in 37 CFR 1.997(e) for *inter partes* reexaminations.

20 Claims, 13 Drawing Sheets

U.S. PATENT DOCUMENTS

| | | | | | |
|---|---|---|---|---|---|
| 3,430,217 | A | | 2/1969 | Bridge et al. | |
| 3,541,450 | A | | 11/1970 | Paine | |
| 3,582,921 | A | | 6/1971 | Krieger | |
| 3,603,951 | A | * | 9/1971 | Bracken et al. | 340/539.28 |
| 3,851,191 | A | | 11/1974 | Deebel et al. | |
| 4,031,467 | A | * | 6/1977 | Singleton et al. | 455/526 |
| 4,035,802 | A | | 7/1977 | Jagermalm et al. | |
| 4,106,340 | A | | 8/1978 | Hamid | |
| 4,130,798 | A | | 12/1978 | Maclaren | |
| 4,140,999 | A | | 2/1979 | Conway | |
| 4,163,216 | A | | 7/1979 | Arpino | |
| 4,184,159 | A | | 1/1980 | Andersson | |
| 4,218,755 | A | * | 8/1980 | Root | 702/3 |
| 4,230,989 | A | | 10/1980 | Buehrle | |
| 4,257,112 | A | | 3/1981 | Hubner | |
| 4,259,864 | A | * | 4/1981 | Tavoni | 73/170.16 |
| 4,274,475 | A | | 6/1981 | Rall et al. | |
| 4,277,845 | A | | 7/1981 | Smith et al. | |
| 4,286,465 | A | | 9/1981 | Thomae | |
| 4,287,762 | A | * | 9/1981 | Baer | 73/170.16 |
| 4,295,139 | A | | 10/1981 | Arpino | |
| 4,298,947 | A | | 11/1981 | Tamura et al. | |
| 4,318,076 | A | | 3/1982 | Whitfield | |
| 4,396,149 | A | | 8/1983 | Hirsch | |
| 4,403,218 | A | | 9/1983 | Beal et al. | |
| 4,403,296 | A | | 9/1983 | Prosky | |
| 4,406,550 | A | | 9/1983 | Gray | |
| 4,428,685 | A | | 1/1984 | Lemelson et al. | |
| 4,447,884 | A | | 5/1984 | Wada | |
| 4,455,096 | A | | 6/1984 | Brandstedt | |
| 4,480,253 | A | | 10/1984 | Anderson | |
| 4,506,994 | A | | 3/1985 | Schwab | |
| 4,521,857 | A | | 6/1985 | Reynolds, III | |
| 4,608,565 | A | | 8/1986 | Sakamoto | |
| 4,627,277 | A | | 12/1986 | Baer | |
| 4,642,775 | A | * | 2/1987 | Cline et al. | 701/200 |
| 4,642,785 | A | | 2/1987 | Packard et al. | |
| 4,706,198 | A | | 11/1987 | Thurman | |
| 4,716,411 | A | | 12/1987 | Nakamura | |
| 4,839,645 | A | * | 6/1989 | Lill | 340/870.17 |
| 4,888,986 | A | | 12/1989 | Baer et al. | |
| 4,905,000 | A | | 2/1990 | Bateman | |
| 4,992,942 | A | | 2/1991 | Bauerle et al. | |
| 5,019,977 | A | | 5/1991 | LaPointe et al. | |
| 5,023,934 | A | | 6/1991 | Wheeless | |
| 5,033,864 | A | | 7/1991 | Lasecki et al. | |
| 5,038,607 | A | | 8/1991 | Baer et al. | |
| 5,101,191 | A | | 3/1992 | MacFadyen et al. | |
| 5,105,191 | A | | 4/1992 | Keedy | |
| 5,117,359 | A | | 5/1992 | Eccles | |
| 5,117,690 | A | | 6/1992 | Baer | |
| 5,178,010 | A | | 1/1993 | Holzel | |
| 5,216,275 | A | | 6/1993 | Chen | |
| 5,223,701 | A | | 6/1993 | Batterman et al. | |
| 5,245,874 | A | | 9/1993 | Baer | |
| 5,255,556 | A | | 10/1993 | Lobdell | |
| 5,265,024 | A | | 11/1993 | Crabill et al. | |
| 5,347,274 | A | * | 9/1994 | Hassett | 340/988 |
| 5,347,476 | A | | 9/1994 | McBean, Sr. | |
| 5,355,350 | A | | 10/1994 | Bass et al. | |
| 5,379,025 | A | | 1/1995 | Tatom et al. | |
| 5,390,237 | A | | 2/1995 | Hoffman, Jr. et al. | |
| 5,434,565 | A | | 7/1995 | Simon et al. | |
| 5,444,433 | A | * | 8/1995 | Gropper | 340/601 |
| 5,444,530 | A | | 8/1995 | Wang | |
| 5,499,024 | A | | 3/1996 | Germanton et al. | |
| 5,509,295 | A | | 4/1996 | Bartoli | |
| 5,517,193 | A | * | 5/1996 | Allison et al. | 342/26 R |
| 5,526,268 | A | * | 6/1996 | Tkacs et al. | 704/8 |
| 5,546,800 | A | | 8/1996 | Daniel | |
| 5,568,385 | A | * | 10/1996 | Shelton | 702/3 |
| 5,582,972 | A | * | 12/1996 | Lima et al. | 435/6 |
| 5,583,972 | A | * | 12/1996 | Miller | 345/419 |
| 5,615,118 | A | | 3/1997 | Frank | |
| 5,689,654 | A | * | 11/1997 | Kikinis et al. | 710/303 |
| 5,696,671 | A | | 12/1997 | Oliver | |
| 5,699,244 | A | * | 12/1997 | Clark et al. | 702/2 |
| 5,717,589 | A | * | 2/1998 | Thompson et al. | 702/3 |
| 5,734,335 | A | | 3/1998 | Brogi et al. | |
| 5,757,322 | A | * | 5/1998 | Ray et al. | 342/460 |
| 5,781,852 | A | * | 7/1998 | Gropper | 455/227 |
| 5,794,164 | A | | 8/1998 | Beckert et al. | |
| 5,796,932 | A | * | 8/1998 | Fox et al. | 1/1 |
| 5,825,814 | A | * | 10/1998 | Detwiler et al. | 375/219 |
| 5,829,000 | A | | 10/1998 | Huang et al. | |
| 5,839,094 | A | | 11/1998 | French | |
| 5,848,378 | A | | 12/1998 | Shelton et al. | |
| 5,850,619 | A | | 12/1998 | Rasmussen et al. | |
| 5,898,680 | A | * | 4/1999 | Johnstone et al. | 370/316 |
| 5,911,507 | A | | 6/1999 | Jaynes | |
| 5,920,827 | A | | 7/1999 | Baer et al. | |
| 5,938,619 | A | | 8/1999 | Dogre Cuevas | |
| 5,943,630 | A | | 8/1999 | Busby et al. | |
| 5,966,442 | A | * | 10/1999 | Sachdev | 380/212 |
| 5,978,738 | A | | 11/1999 | Brown | |
| 6,014,606 | A | * | 1/2000 | Tu | 701/200 |
| 6,046,674 | A | | 4/2000 | Irwin et al. | |
| 6,076,044 | A | | 6/2000 | Brown | |
| 6,154,143 | A | | 11/2000 | Robinson | |
| 6,177,873 | B1 | | 1/2001 | Cragun | |
| 6,181,324 | B1 | | 1/2001 | Lamb et al. | |
| 6,195,018 | B1 | * | 2/2001 | Ragle et al. | 340/870.01 |
| 6,202,023 | B1 | | 3/2001 | Hancock et al. | |
| 6,243,056 | B1 | | 6/2001 | Jachimowicz et al. | |
| 6,252,505 | B1 | | 6/2001 | Bade | |
| 6,300,871 | B1 | | 10/2001 | Irwin et al. | |
| 6,311,107 | B1 | | 10/2001 | Curto et al. | |
| 6,357,292 | B1 | | 3/2002 | Schultz et al. | |
| 6,490,525 | B2 | | 12/2002 | Baron, Sr. et al. | |
| 6,597,990 | B2 | | 7/2003 | Brown | |

FOREIGN PATENT DOCUMENTS

| | | | | |
|---|---|---|---|---|
| EP | 0 622 639 | A2 | | 11/1994 |
| EP | 0 743 535 | A1 | | 11/1996 |
| EP | 0743 535 | A1 | | 11/1996 |
| GB | 1557183 | | | 12/1979 |
| GB | 2261536 | | | 5/1993 |
| JP | 49-31294 | | | 10/1975 |
| JP | 53-126974 | | | 4/1977 |
| JP | 51-97341 | | | 3/1978 |
| JP | 53-37732 | | | 10/1978 |
| JP | 52-84691 | | | 2/1979 |
| JP | 55-150099 | | | 11/1980 |
| JP | 54-79540 | | | 2/1981 |
| JP | 57-040621 | | | 3/1982 |
| JP | 63-204896 | | * | 8/1988 |
| JP | 63204896 | A | | 8/1988 |
| JP | 01-282487 | | | 11/1989 |
| JP | 02-141692 | | | 5/1990 |
| JP | 03-018789 | | | 1/1991 |
| JP | 0513420 | A1 | | 5/1991 |
| JP | 05-005788 | | | 1/1993 |
| JP | 05-005789 | | | 1/1993 |
| JP | 05-008486 | | | 1/1993 |
| JP | 05-027048 | | | 2/1993 |
| JP | 05-50389 | | | 3/1993 |
| JP | 05-052965 | | | 3/1993 |
| JP | 05-060879 | | | 3/1993 |
| JP | 05-249252 | A | | 9/1993 |
| JP | 05-341055 | | | 12/1993 |
| JP | 05-341056 | | | 12/1993 |
| JP | 06-059054 | | | 3/1994 |
| JP | 06-088880 | | | 3/1994 |
| JP | 06-167577 | | | 6/1994 |
| JP | 06-324163 | | | 11/1994 |
| JP | 07-007769 | | | 1/1995 |
| JP | 07-012959 | | | 1/1995 |
| JP | 07-077583 | | | 3/1995 |
| JP | 07-077584 | | | 3/1995 |
| JP | 07-0129546 | | | 5/1995 |
| JP | 07-191152 | | | 7/1995 |
| JP | 08-005761 | | | 1/1996 |
| JP | 08-029545 | | | 2/1996 |
| JP | 08-029546 | | | 2/1996 |
| JP | 8095948 | | | 4/1996 |
| JP | 08-297171 | | | 11/1996 |
| RU | 2163026 | | | 10/1999 |

| | | |
|---|---|---|
| WO | WO 94/16394 | 7/1994 |
| WO | WO 97/13161 | 4/1997 |
| WO | WO 97/28460 | 8/1997 |
| WO | WO 97/35209 | 9/1997 |
| WO | WO 00/77755 | 12/2000 |

OTHER PUBLICATIONS

WS-2000 Wireless Weather Station http//www.rainwise.com/ws2000/index.html, dated printed Dec. 7, 2005.
An Overview of NHC Prediction Models http://www.srh.noaa.gov/ssd/nwpmodel/html/nhcmodel.htm (pp. 1-10), date printed Jan. 28, 2005.
The only wireless indoor/outdoor temperature monitor (1 page), dated 1988.
RF Solutions Ltd. Holtck Enryption Chipset http://www.rfsolutions.co.uk/acatalog/Holtek_Encryption_Chipset.html (1 page), date printed Jan. 17, 2005.
Question No. 1307996.006 Weather Detection Device Novalynx file://C:\Documents%20and%20Settings\wsquire\Local%20 Settings\Temp\NERAC1.HTM (pp. 1-19 ), dated printed Jul. 1, 2005.
Question No. 1307996.007 Weather Detection Device Weather Forcasting file://C:\Documents%20and%20Settings\wsquire\ Local %20Settings\Temp\NERAC1.HTM (pp. 1-51) , dated printed Jul. 1, 2005.
100-2310 Wireless Weather Station http://www.novalynx.com/100-2310.html, date printed Jul. 1, 2005.
Kaplan, John, et al. "A Simple Empirical Model for Predicting the Decay of Tropical Cyclone Winds after Landfall" AOML/NOAA, Hurrican Research Division, 4301 Rickenbacker Causeyway, Miami FL, 33149, pp. 2499-2512, dated Nov. 1995.
Sutherland, Robert A., "A Short Range Objective Nocturnal Temperature Forecasting Model" 1980 American Meterological Society pp. 247-255, dated Jan. 9, 1980.
Woodley, William L., et al., "The Inference of Gate Convective Rainfall from SMS-1-Imagery", Journal of Applied Meterology, vol. 19, pp. 388-408, Apr. 1980.
Hard-To-Find-Tools Brookstone, Jul. 27, 2005 No. 186, p. 3-9.
Advertisement "The Windindcator" Weatherwise, Inc. Dec. 1995/Jan. 1996, p. 46.
Advertisement "The WS-2000 Wireless Solar Powered Weatherstation from Rainwise" Weatherwise Apr./May 1997, p. 51.
Advertisement "Comfortstat Weather Products Instruments for Weather and Many Other Uses", date unknown.
Advertisement "Don't Just Talk About the Weather, Predict It!" Weather Wise, Oct./Nov. 1995 p. 10.
Advertisement "Don't Just Talk About The Weather Predict It" Weatherwise, Aug./Sep. 1996, p. 43.
Advertisement "Introducing the Weather Report The Complete Weather Station", Weatherwise, Aug./Sep. 1991, p. 54.
Advertisement "The Weather Report and Weather Report Logger" Weatherwise, Aug./Sep. 1995, p. 52.
Advertisement "Be Your Own Weatherman." Weather Monitor II The Professional Home Weather Station, Davis Instruments, date unknown.
Advertisement "The Talking Weather Station" Itworks, date unknown.
Advertisement "MultiFAX Card and Software", date unknown.
Advertisement "Weatherwise Photography Contest", date unknown.
Advertisement "The Fourth Dimension Displaying Weather Over Time" Weather Dimensions, Inc., date unknown.
Advertisement "The Talking Weather Station Clima Talker" Windward Systems, Inc. , date unknown.
Advertisement "Monitor Weather in Real Time on Your PC/Mac" Fascinating Electronics, Inc., date unknown.
Advertisement "Serious Equipment for Serious Weather Watchers" Weather Wizard II, Weather Monitor II, Weatherlink, Davis Instruments, date unknown.
Advertisement "Why the new Ultimeter® 2000 is The World's best home weather station" Peet Bros. Company, date unknown.
AAI SMI Systems Management, Automated Surface Observing System (ASOS), dated 1992.
RadioShack, 7 Channel Same Weatherradio, Owner's Manual, Sep. 13, 2000, pp. 1-24.
No Author cited, "Funkthermometer", ELV Journal, vol. 2, 1997, pp. 2-5.
"New Temperature Sensors Ride Inside Reefer Boxes", Journal of Commerce, Transportation and Trade, Technology, p. 28, Sep. 19, 1994.
Temperature Station with Radio-Controlled Time Instruction Manual, pp. 1-9, 1997.
OS Technology AG, manufactured by IDT Technology Limited, Remote Thermometer System, THR 128, Version 1-3, Type Approval Date Oct. 13, 1997.
La Crosse Technology, WS-7054U Wireless 433 MHz Temperature Station Instruction Manual, pp. 1-34, Oct. 13, 1997.
Multi-channel In-Out Thermometer with Cable Free Sensor and RF Clock, Model: RMR 112, User's Manual, pp. 1-11, Jul. 17, 1998.
Multi-Channel In-Out Cable Free Thermometer, Model EMR812, User's Manual, pp. 1-11, 1998.
Digital Weather Forecaster with Hygrometer and RF Clock, Model BAR913, User's Manual, pp. 1-11, 1998.
Digital Weather Forecaster with Moon Phase and RF Clock, Model BAR912, User's Manual, pp. 1-12, 1998.
Digital Weather Forecaster with Remote Thermo-Sensor and Radio Controlled Clock, Model BAR112, User's Manual, pp. 1-11, 1998.
Oregon Scientific, electronic Barometer Model BA-116, Instruction Manual, pp. 1-9, 1998.
Weather Forecast Multi-Channel In-Out Thermometer with Cable Free Sensor and radio Controlled Clock, Model BAR888, User's Manual, pp. 1-13, Jul. 17, 1998.
Deluxe I/Out Remote Thermometer with Trend Chart Model JTR-168LR, User's Manual, pp. 1-9, Jul. 17, 1998.
Point Six, Inc., Point Receiver, Product Description, pp. 1-20, 2001.
Point Six, Inc., Wireless Temperature/Relative-Humidity or Light Sensor Model WOWTHL, Installation and Operation Instructions, pp. 1-4, 2001.
DesignTech International, Inc., Wireless Indoor/Outdoor Thermometer, Operating Instructions, FCC ID: Elgthermotx, pp. 1-3, 2001.
Belfort Instrument, DigiWx Automated Digital Weather System, pp. 1-3, 2001.
Oregon Scientific, Mini Remote Thermometer Model MTR101, User's Manual, pp. 1-2, Feb. 16, 2001.
La Crosse Technology, Professional Remote Weather Station, Operation Manual, pp. 1-20, Jul. 23, 2002.
Brookstone WeatherSmart Indoor/Outdoor Thermometer Transmitter, User's Manual, pp. 1-20, Sep. 25, 1997.
Davis Instruments, Weather Echo & Weather Echo Plus Installation Manual, pp. 1-24, Rev. C Manual May 11, 2000.
Davis Instruments, Wireless Temperature Station, Installation Manual, pp. 1-12, Rev. A, Dec. 7, 2000.
Davis Instruments, Wireless Temperature/Humidity Station, Installation Manual, pp. 1-12, Rev A, Oct. 19, 2001.
Davis Instrument, Wireless Vantage Pro Weather Station, Console Manual, pp. 1-64, Rev. B, Aug. 20, 2001.
ELV, WS 2010, Radio Transmission Weather Station, Operating Instruction, pp. 1-23, 1st edition, Jun. 1999.
ELV, WS 2000, Komfort-Funk-Wetterstation WS-2000, Bedienungsanleitung, pp. 1-23, Nov. 1997.
Linx Technologies, LC Series Transmitter Module Data Guide, product description, pp. 1-7, obtained Jan. 15, 2002.
Oregon Scientific, Cable Free Weather Station Model WMR112, User's Manual, pp. 1-9, obtained Jan. 10, 2002.
Oregon Scientific, Cable Free Weather Station Model WMR918, User's Manual, pp. 1-9, obtained Jan. 10, 2002.
Oregon Scientific, Cable Free Weather Station Model WMR968 User's Manual, Aug. 10, 2001.
RadioShack.Com, 433 MHz Wireless Weather Station, Cat. #:63-1016, Product description, obtained Jan. 15, 2002.
RainWise WS-2000 Weatherstation, Wireless & Solar Powered, User's Guide, pp. 1-5, obtained Jan. 15, 2002.
Speedtech Instruments, WS-112 Weather Station product description, Internet web page obtained Nov. 14, 2000.
Adcon Telemetry, AgroExpert Network, Product Brochure, Oct. 20, 1996.

Campbell Scientific, Inc., CR10X Measurement and Control System, Product Description, Jun. 1996.
Campbell Scientific, Inc., RTMS Real-Time Monitoring Software, Product Description, Aug. 1994.
Campbell Scientific, Inc., Campbell Scientific Weather Stations, Product Description, May 1996.
Motorola IRRInet—Irrigation Control System and Scorpion DC Irrigationi Products, Product description, 1994.
Oltman, David, "Network News", Reprinted from California Farmer, Mar. 1996, 4 pages.
La Crosse Technology, FCC-OMO -01RX, HFS 301-WS Operation Description, 3 pages.
Millenium enterprise Limited, IE Headwaters Research, Product: Weather Watch/Weather Smart, RFTM Transmitter, Feb. 23, 1999.
Pravda, News and Analysis On-Line, "South Urals Enterprise Started Producing Home Weather Stations", Aug. 26, 2002 at http://english.pravda.ru/region/2002/08/26/35297_.html.
Royal WS-44 Operational Manual, pp. 1-6.
Davis Instruments, Wireless Vantage Pro & Vantage Pro Plus Stations, Specifications, 6 pages, Mar. 13, 2002.
ELV weather station WS 7000, Ebay Article No. 1342362470, 2 pages.
ELV weather station WS 1000, Ebay Article No. 1343024071, 3 pages.
General Electric, Weather Station Wireless Thermometer, FCC ID BLD 0776 TX, Instruction Manual, obtained Dec. 14, 2002.
Altitude, WE 1 Explorer Weather Station, 1 page.
Chaney Instrument, Wireless Thermometer and Sensor, Press Releases, Images, at www.chaneyinstument.com/Press%20 Releases/00735.html.
Altitude, Meteo Explorer, Product Description, pp. 37-67, Sep. 17, 2001.
General Electrical Wireless Digital Weather Station, Product sale information at www.amazon.com/exec/obidos/tg/detail/-/B00006ANEQ/pictures/14/14/102-5656562-. . . , obtained Dec. 14, 2002.
FCC Part 15 Subpart C Certification Report for Low Power Transmitter, Test Report No. HM108276, dated Jul. 20, 2002.
Royal Consumer Product, FCC LSC 061STX.
Electronics Tomorrow, FCC ID PEQ 752S90502, Preliminary Instruction Manual, Oct. 17, 2002.
William Young, Jr. and Joe Schmidt, "PV Powering a Weather Station for Severe Weather", 7 pages obtained Dec. 15, 2002.
Sottile, G.M. et al., "Assessment of Attitudes and Expectations of Switchable Glass Among United States Window Manufacturers", Society of Vacuum Coaters, 45th Annual Technical Conference Proceedings, p. 14, Obtained Dec. 15, 2002.
Headwaters Research & Development, Inc. RF Thermometer, Product diagrams, 4 pages, Jun. 1997.
Davis Instruments, Precision Weather Instruments, Product catalog 2000.
Wind & Weather, Weather Instruments, Product catalog Spring 2001.
Wind & Weather, Weather Instruments, Product catalog Holiday 2002.
Davis Instruments, Precision Weather Instruments, Product catalog 2003.
Multi-Channel In-Out Cablefree Thermo-Hygrometer, Model: BHGR618, User's Manual, 6 pages, Jul. 24, 2001.
Wireless Rain Gauge, Model BHR616, User's Manual, 5 pages, Jul. 24, 2001.
Weather Station, Model BHB613, User's Manual, 4 pages, Jul. 24, 2001.
Radio Controlled Alarm Clock, Model BHM-612A, User's Manual, 4 pages, Jul. 24, 2001.
Handar Headquarters, *555 Digitized Speech Module*, Nov. 7, 1995, 1 page.
AAI SMI, *Automated Surface Observing System*(ASOS), 1992, 3 pages.
ASOS, *History of Automated Observing Systems*, Mar. 29, 1999, 1 page.
Campbell Scientific, Inc., *Cellular Telephone Package for Remote Datalogger Sites in the USA*, 1993, 2 pages.
Ted Reiger, *Growers Network On-Line for Better Disease Control*, Vineyard & Winery Management, Mar./Apr. 1995 issue, pp. 1-4.
Handar, Inc., Telemetry Options, 1994, 1 page.
Handar International, *REMS-TALK, Handar Books Major DCB Contract In Brazil*, Sep. 1995, 2 pages.
Adcon Telemetry, Radio Network Module A730MD, 1994, 1 page.
Campbell Scientific, Inc., *Radiotelemetry Networks*, May 1995, 4 pages.
Campbell Scientific, Inc., *Data Storage And Transfer*, Jun. 1994, 4 pages.
Campbell Scientific, Inc., *The Campbell Update*, Sep. 1994, vol. 5, No. 2, pp. 1,5.
Campbell Scientific, Inc., *The Campbell Update*, Feb. 1994, vol. 5, No. 1, pp. 1,4,5.
NOAA, The Amateur Weather Forecaster, Oct. 1979, vol. 9, No. 4, 8 Pages.
Andrew D. Stern, et al., Bulletin of the American Meteorological Society, *Identification of Aviation Weather Hazards Based On Integration of Radar and Lightning Data*, Dec. 1994, vol. 75, No. 12, pp. 2269-2280.
Elbert W. Friday, Jr., Bulletin of the American Meteorological Society, *The Modernization and Associate Restructuring of the National Weather Service: An Overview*, Jan. 1994, vol. 75, No. 1, pp. 43-52.
Fred V. Brock, et al., Journal of Atmospheric and Oceanic Technology, *The Oklahoma Mesonet: A Technical Overview*, Feb. 1995, vol. 12, pp. 5-19.
Thomas Rossby et al., Bulletin of the American Meteorological Society, *The Volunteer Observing Ship and Future Ocean Monitoring*, Jan. 1995, vol. 76, No. 1, pp. 5-11.
David Parsons, et al., Bulletin of the American meteorological Society, *The Integrated Sounding System: Description and Preliminary Observations from Toga Coare*, Apr. 1994, vol. 75, No. 4, pp. 553-567.
Stanley G. Benjamin, et al., Monthly Weather Review, *An Isentropic Three-Hourly Data Assimilation System Using ACARS Aircraft Observations*, Apr. 1991, vol. 119, pp. 888-906.
Paul A. Hirschberg, et al., Bulletin of the American Meteorological society, *The West Coast Picket Fence Experiment During Storm-Fest*, Oct. 1995, vol. 76, No. 10, pp. 1741-1800.

* cited by examiner

SEVERE WEATHER DETECTOR AND ALARM

Matter enclosed in heavy brackets [ ] appears in the original patent but forms no part of this reissue specification; matter printed in italics indicates the additions made by reissue.

This application is a continuation of Ser. No. 09/246,784 filed Feb. 1, 1999 now U.S. Pat. No. 6,076,044, which is continuation of Ser. No. 08/799,838 filed Feb. 13, 1997, now U.S. Pat. No. 5,978,738.

BACKGROUND OF THE INVENTION

1. Field of the Invention

The present invention relates to an unmanned weather detecting and reporting station. More specifically, the novel station has apparatus for detecting severe weather conditions such as tornadoes and lightning. The station has sensors for sensing certain critical ambient characteristics, a microprocessor for comparing sensed data to a database, a radio for receiving weather data from remote broadcasting sources, and apparatus for broadcasting inferred and reported weather patterns.

2. Description of the Prior Art

Severe weather conditions can arise quite suddenly, with potentially great catastrophic consequences in financial and human cost. To avoid or minimize injury and damage from sudden, violent weather phenomena, it is desirable to be able to predict such occurrences. If weather conditions can be predicted, it is possible in many instances to take steps to mitigate undesirable consequences of the unleashed forces.

An example of a field of activity which could benefit greatly from such analysis and warning of weather conditions is that of aviation. Take off and landing are subject to disruption from extreme weather conditions. Aircraft may be rerouted or their departures and landings postponed if significant threats from weather are identified. Therefore, a need clearly exists for detection and annunciation of extreme weather conditions.

The prior art has suggested a number of weather analysis and warning systems. U.S. Pat. No. 5,105,191, issued to Edgar L. Keedy on Apr. 14, 1992, describes apparatus and method for detecting and indicating severe air disturbances such as shear winds and clear air turbulence. This invention does not address electrical phenomena, as it is primarily intended for providing information essential for take off and landing decisions for advising aircraft pilots. By contrast, the present invention considers different parameters, and detects electrical phenomena such as lightning.

Apparatus and method for identifying tornadoes are set forth in U.S. Pat. No. 5,355,350, issued to Henry E. Bass et al. on Oct. 11, 1994. The subject method employs detection and analysis of ambient sound for amplitude and frequency which may be associated with tornadoes. By contrast, the present invention considers other parameters of ambient conditions, and predicts both tornadoes and also electrical phenomena, such as lightning.

Another tornado detection scheme is seen in U.S. Pat. No. 5,379,025, issued to Frank B. Tatom et al. on Jan. 3, 1995. This invention monitors seismic waves generated by an impending tornado. By contrast, the present invention does not consider seismic phenomena, looking instead to airborne phenomena. The present invention predicts electrical phenomena as well as tornadoes and the like.

U.S. Pat. No. 5,444,530, issued to Ting-I Wang on Aug. 22, 1995, describes a remote monitor for airfields which employs distortion of partially coherent light to detect precipitation and identify the same as rain or snow. By contrast, the present invention monitors different parameters of the atmosphere, notably temperature, humidity, barometric pressure, light, and static charge. The present invention infers presence of extreme weather conditions not analyzed by Wang, such as lightning and tornadoes.

None of the above inventions and patents, taken either singly or in combination, is seen to describe the instant invention as claimed.

SUMMARY OF THE INVENTION

The present invention combines weather detecting apparatus for detecting local conditions with communications apparatus for obtaining information relating to distant weather conditions. From this combination, a user may ascertain current local conditions which are not apparent to the senses and information regarding imminent or otherwise relevant conditions.

This combination of information enables a person to organize his or her activities appropriately. Detection of severe weather phenomena may cause a person to take actions to protect life and property in the immediate vicinity being monitored. Alternatively, a person may select an appropriate location for travel, if avoidance of local weather is required or if previous travel plans must be modified.

The novel weather station thus both analyzes and reports weather conditions. The communication apparatus enables selection of information from any selected location on the globe, and voice synthesizing apparatus for annunciating selected weather information in a selected language. The voice synthesizing apparatus further is capable of offering operating choice selection prompts in synthesized voice form and of responding to verbal selections by the user.

Preferably, weather conditions being monitored by sensing or by gleaning information from remote radio broadcasts relate to violent or severe conditions most likely to threaten life and property. Ambient characteristics which may be sensed to infer imminent actual weather conditions include temperature, humidity, light intensity, barometric pressure, and potential of ambient static charges. These conditions may then be analyzed by a data processor integral with the weather station to predict imminent weather conditions. The results may be annunciated either by synthesized voice or by indicating lights or the like. In particular, the communications apparatus of the novel weather station is compatible with different international cellular protocols, so that data corresponding to distant weather conditions is obtained by receiving distant local weather condition broadcasts.

The actual apparatus is quite compact, and comprises two separably connected sections. For this reason, the novel weather station is readily portable and easily utilized. A receiver section includes cellular circuitry enabling communications with the external world. A sensor section contains sensors for determining local weather conditions and a microprocessor for accomplishing the various functions of the weather stations. Each of the two separably connected sections has a battery for providing power enabling operation independently of the other respective section.

Accordingly, it is a principal object of the invention to provide a portable weather station which can predict local severe weather conditions.

It is another object of the invention to provide a portable weather station which can obtain information relating to remote weather conditions.

It is a further object of the invention that the weather station be operated to a significant extent by vocalized prompts.

Still another object of the invention is that the weather station be compatible with a variety of languages.

An additional object of the invention is to cooperate with a variety of international cellular protocols.

It is again an object of the invention that the novel weather station comprise two manually separable sections.

Yet another object of the invention is that the novel weather station carry on board a source of power for its operation.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
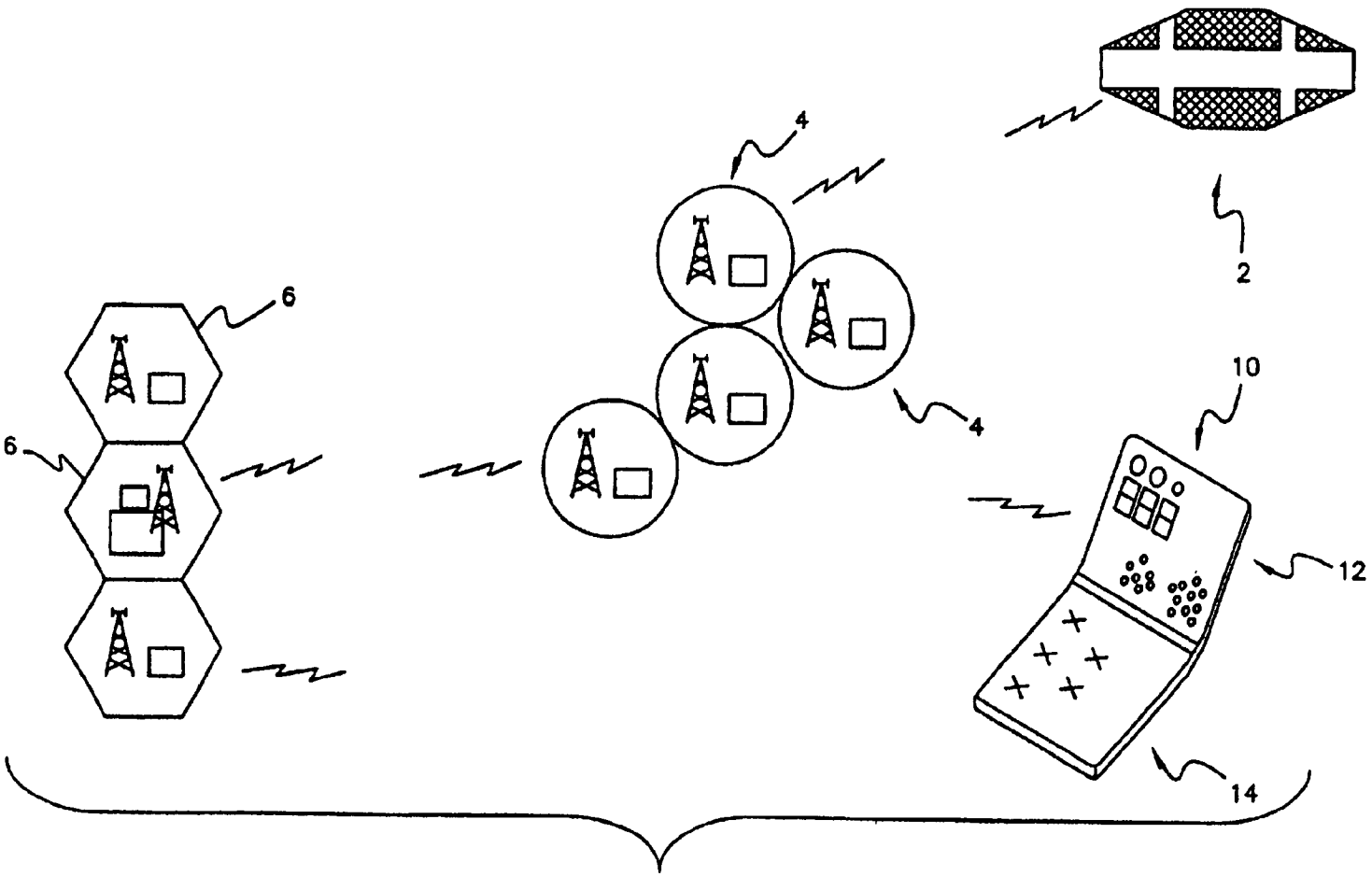
FIG. 1 is an environmental, diagrammatic view of the invention.

FIG. 1 of the drawings shows cooperation between the novel weather analyzing and reporting station 10 and a conventional communications system utilizing cellular technology. The conventional system includes weather satellites, represented by satellite 2, radio receiving and broadcasting facilities, represented by towers 4, and cellular transmission facilities, such as Mobile Telephone Switching Offices, represented by cells 6. Satellite 4, towers 6, and cells 8 are conventional. The novel weather station 10 cooperates with these conventional facilities in gathering weather data.

Weather station 10 comprises two manually separable sections, including a receiver section 12 having radio communication apparatus therein for communicating with an external cellular radio frequency communication system, as represented by cells 6, and a sensor section 14 containing sensors for sensing local ambient weather conditions. Receiver section 12 also contains a microprocessor 16 and a source of power for operating weather station 10. Sections 12 and 14 are removably connected to one another by structure which will be further described hereinafter.

Figure 2:
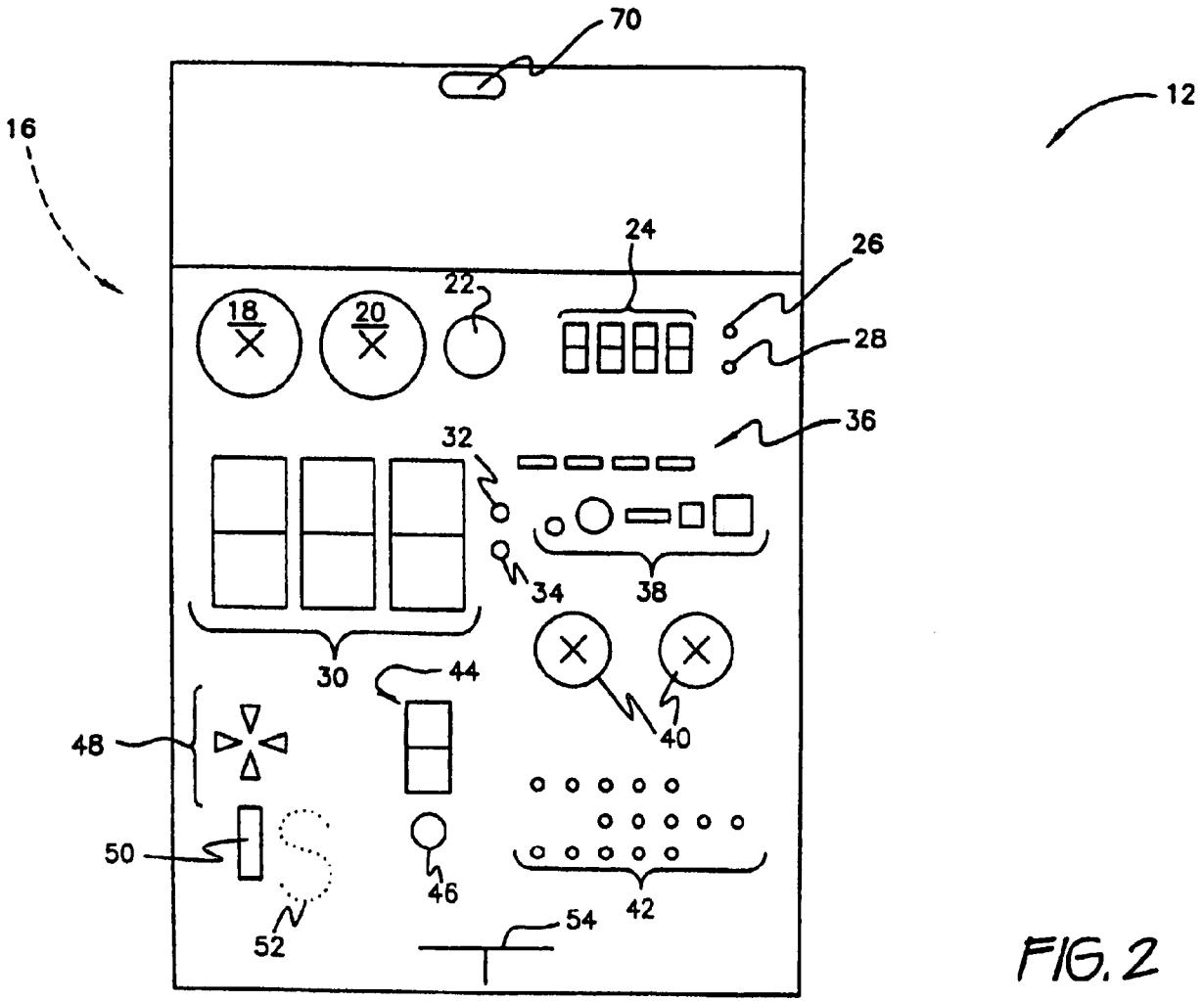
FIG. 2 is a front plan view of one of the two separable sections of the novel weather station, illustrating control and communications apparatus located on the exterior thereof, this section being referred to as a receiver section.

FIG. 2 shows the front panel of receiver section 12, whereon controls, visual displays, and a microphone 18 are mounted. An omnidirectional speaker 20 and a volume control 22 are disposed proximate microphone 18. A visual display 24 indicates date or time. Selector buttons 26, 28 enable selection of date or time to be indicated on display 24. A three digit display 30 is provided for indicating temperature. Selector buttons 32 and 34 select between Celsius and Fahrenheit scales. A display 36 indicates radio signal strength by progressive illumination of its individual illuminable elements.

A relative temperature display 38 indicates local temperature. A proximity sensor 40 detects whether the user is so close to weather station 10 as to interfere with reception of radio signals. An array 42 of light emitting diodes (LED) is utilized to display information regarding mode of operation. A master on-off switch 44 and a reset button 46 are provided. An emergency light 48 and a switch 50 for a purpose described hereinafter are disposed upon the front panel of receiver section 12. Switch 50 is identified by a bas relief or raised symbol 52 for the benefit of the blind. A T-LED 54 is disposed at the bottom of the front panel.

Figure 3:
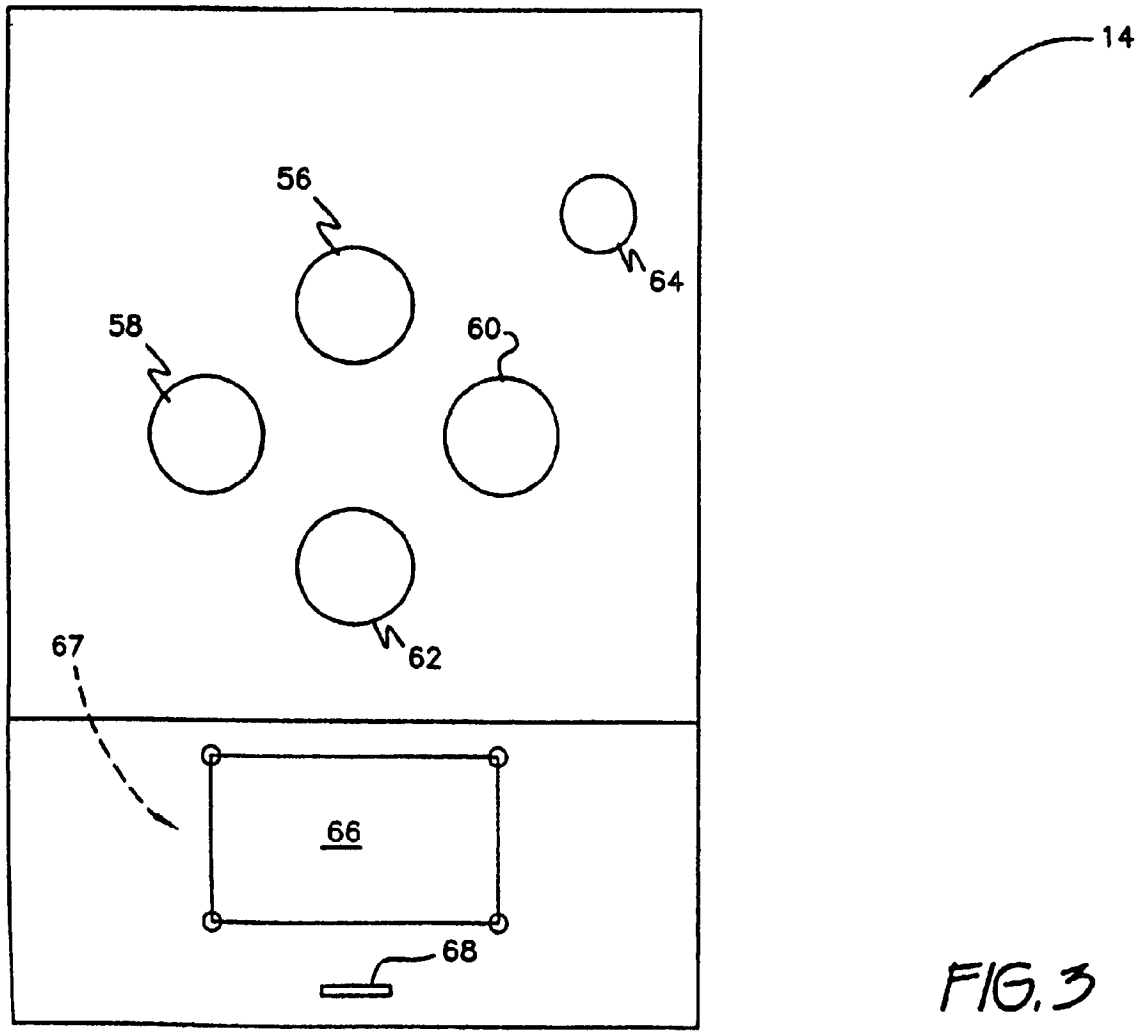
FIG. 3 is a front plan view of the other of the two separable sections of the novel weather station, illustrating components mounted on the exterior thereof, this section being referred to as a sensor section.

FIG. 3 shows components mounted on the exterior of sensing section 14. A temperature sensor 56, such as model MTS102, manufactured by Motorola Corporation, is provided to sense ambient temperature. A barometric pressure sensor 58, such as model MPX200A, manufactured by Motorola Corporation, senses ambient air pressure. A humidity sensor 60, such as model Minicap 2/5, manufactured by Panametrics Corporation, senses ambient humidity. A light sensor 62, which may be a model TSL235, as manufactured by Texas Instruments, senses visible light, and a static charge sensor 64, which may be model KML10/B/2, as manufactured by Phillips Semiconductor, senses ambient static potential. Sensors 56, 58, 60, 62, and 64 each incorporate a transducer for generating a data signal indicative of values of their respective sensed weather characteristics.

A closure 66 affording access to a battery 67 (concealed in FIG. 3) within sensor section 14 is also disposed upon the exterior of sensor section 14. Battery 67 is preferably a 9 volt lithium battery. A snap 68 for removably connecting sensor section 14 to receiver section 12 is provided. A corresponding second snap 70 (see FIG. 2) is located on receiver section 12.

Figure 4:
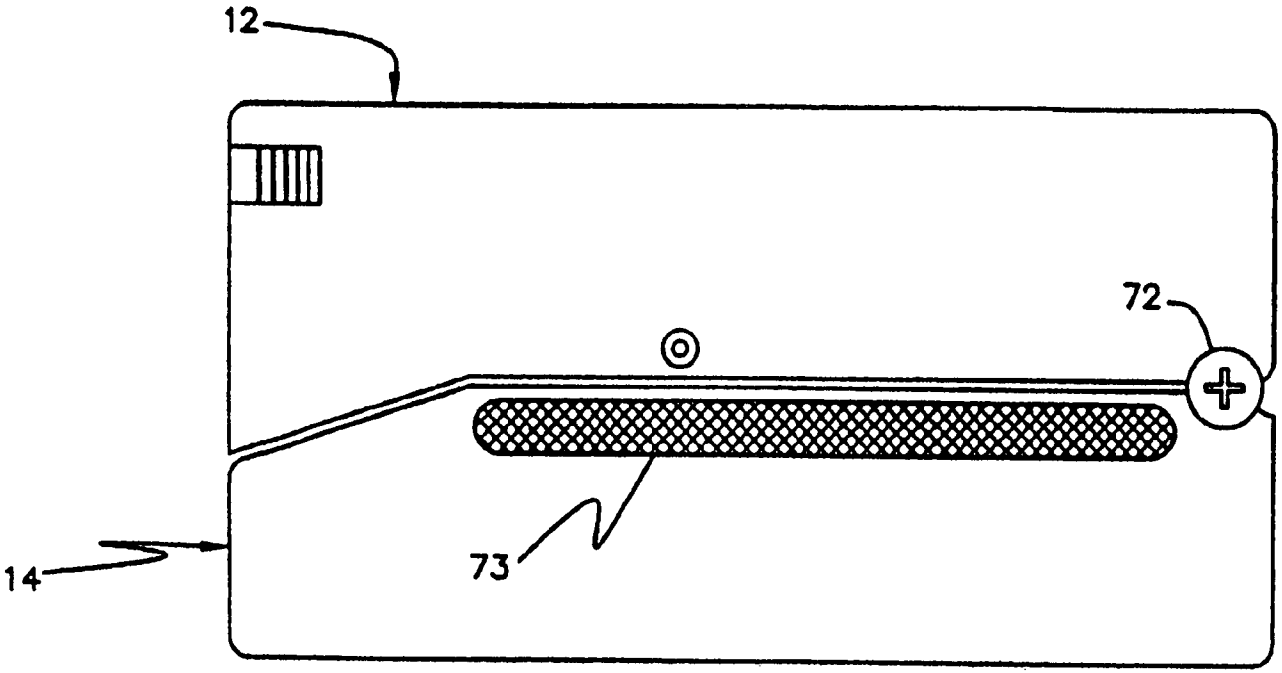
FIG. 4 is an end elevational view of the two sections of the novel weather station united.

FIG. 4 shows sections 12 and 14 connected. A screw 72 passes journaled or similarly entrapped within section 12 passes through a bored boss (not shown) formed in section 14. A screw (not shown) similar to screw 72 but oppositely directed is utilized at the opposite, concealed end of sections 12 and 14 to complement screw 72. Sections 12 and 14 are separated or disconnected by removal of these screws. A gold mesh protector 73 protects an antenna (further described hereinafter) serving sensor section 14.

Figure 5:
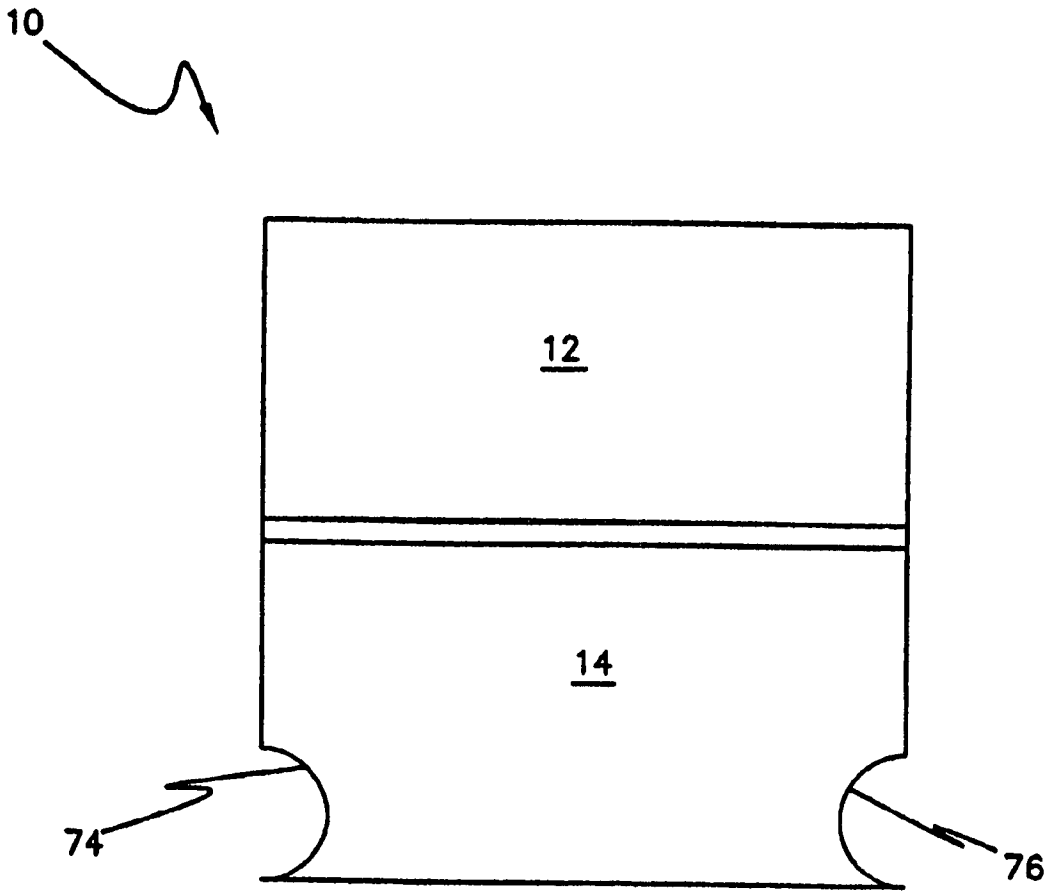
FIG. 5 is a side elevational view of FIG. 4.

FIG. 5 shows sections 12 and 14 connected, and clearly shows grooves 74, 76 formed in sensor section 14 for manually grasping sensor section 14.

Figure 6:
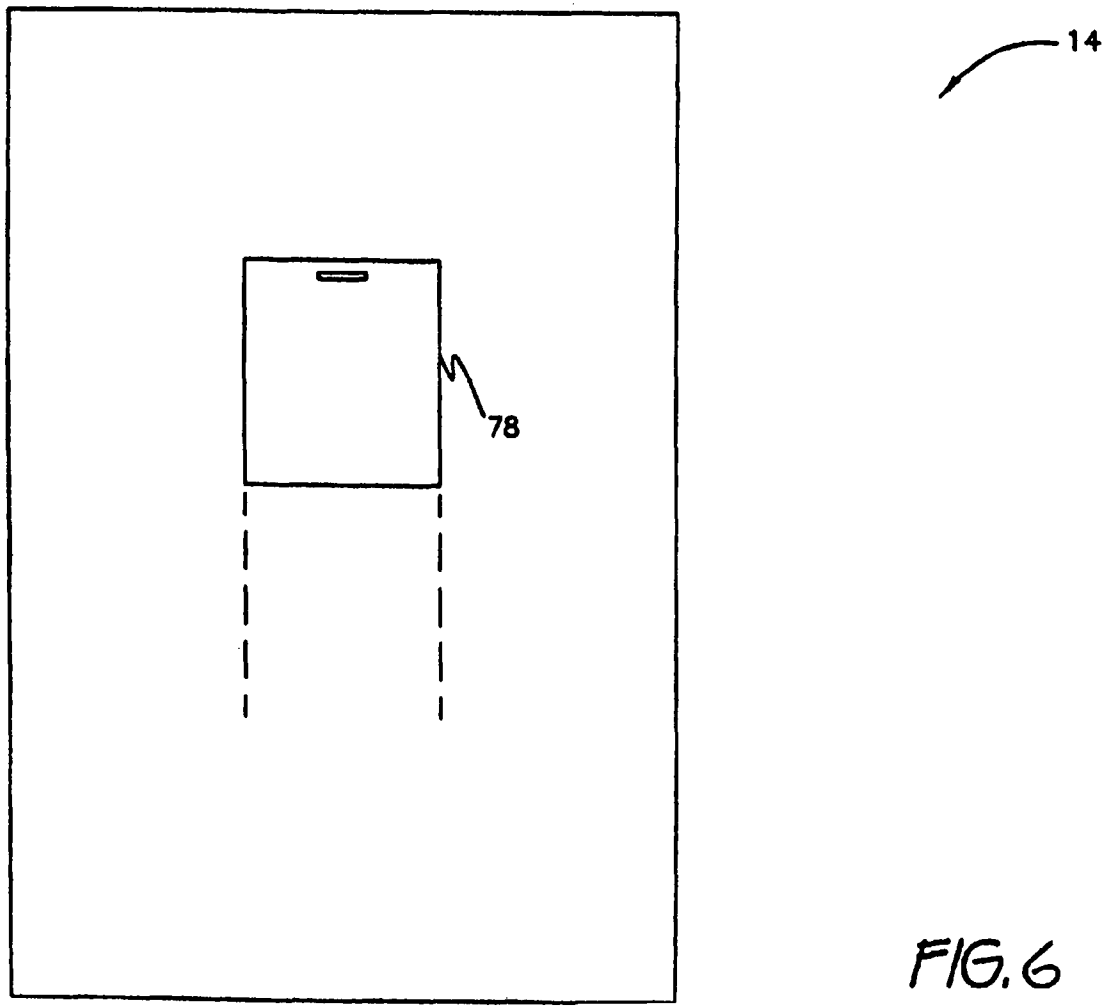
FIG. 6 is a rear plan view of the sensor section.

Referring now to FIG. 6, when separated or disconnected, sensor section 14 may be suspended from a selected external or environmental object (not shown) by the following arrangement. Sensor section 14 has a closure 78 which may be opened to reveal a chamber (not shown) and a strip of hook and loop fastener (not shown). The strip of hook and loop fastener extends outside the chamber so that it may be removably mated with a corresponding patch of hook or loop material (not shown) which has been permanently mounted on the selected environmental object. This arrangement allows temporary support of sensor section 14 in a designated location when not connected to receiver section 12. The chamber enclosing the strip of hook and loop material is sealed to prevent ingress of moisture into sensor section 14.

Figure 7:
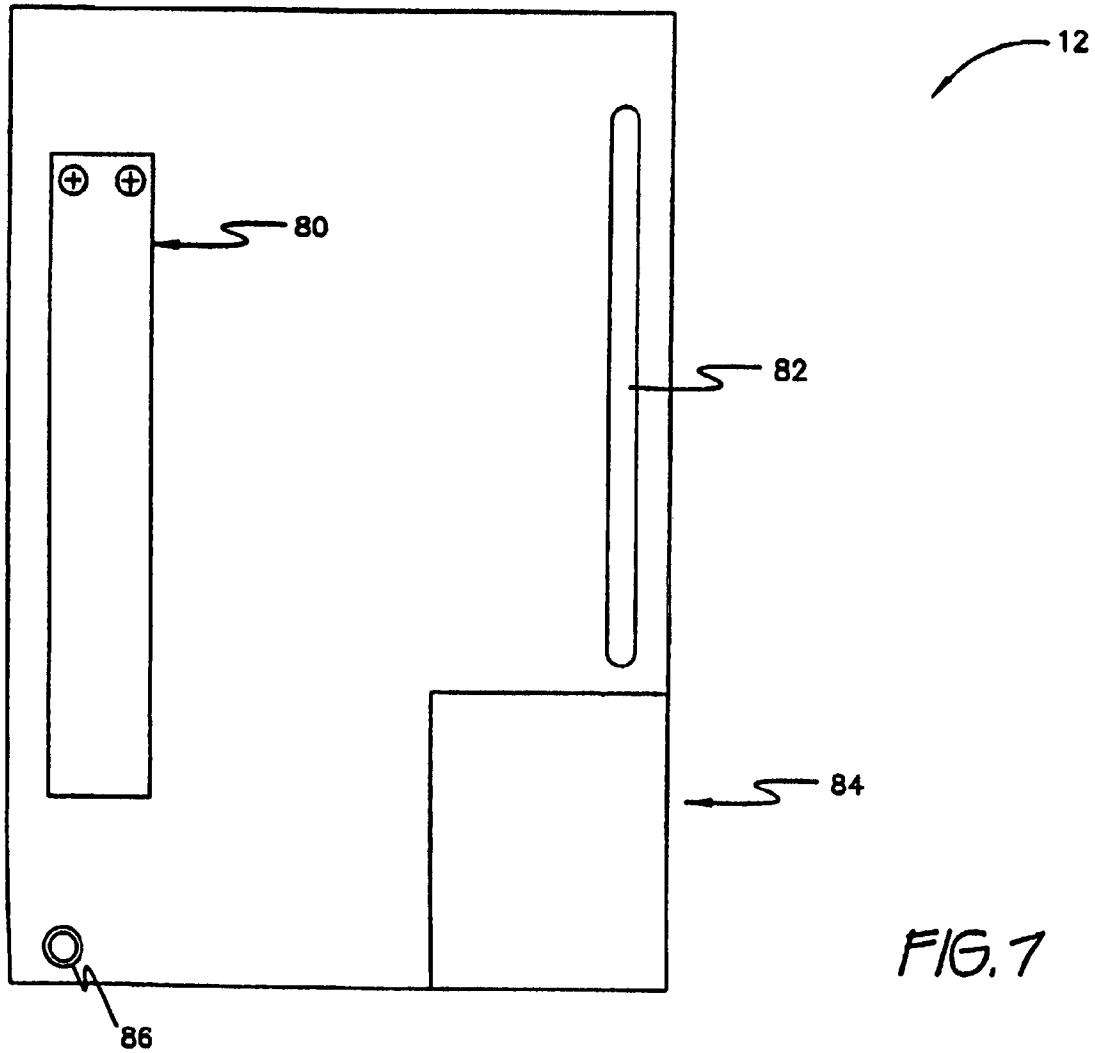
FIG. 7 is a rear plan view of the receiver section.

As shown in FIG. 7, receiver section 12 has an external antenna 80, a stepper motor controller 82, a power supply 84, and a standard DC power connection port 86. Power supply 84 comprises a converter for converting 120 volt AC power to nominal 12 volt DC power and a nominal 12 volt lithium battery. Port 86 is configured to accept any one of many well known connectors. Port 86 is electrically connected to power supply 84, so that supply 84 may be recharged when connected to an external source of power. When not so connected, receiver section 12 derives power from power supply 84.

Figure 8:
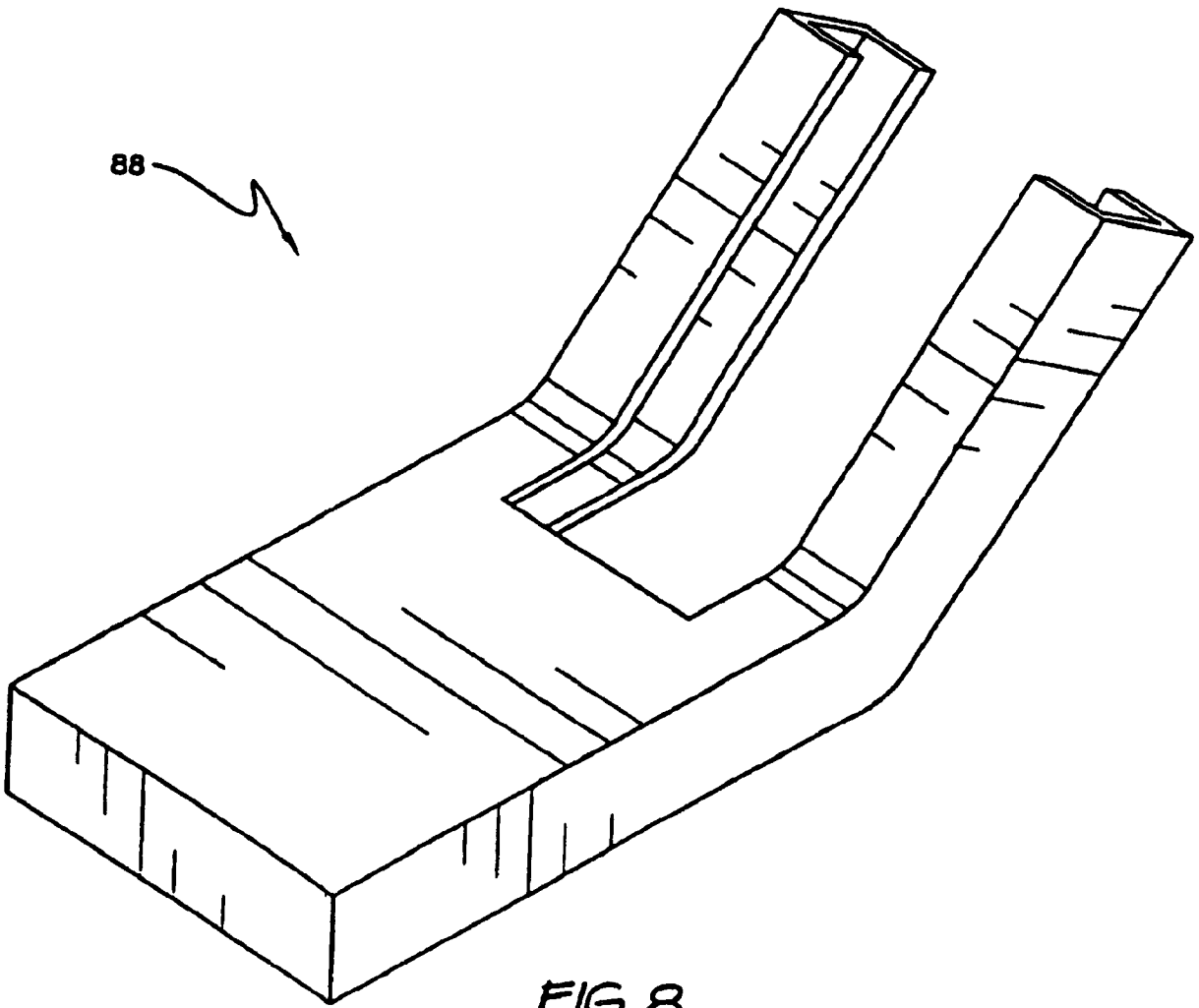
FIG. 8 is a perspective view of an accessory for supporting the receiver section when disconnected from the sensor section.

FIG. 8 illustrates a holder 88 for holding receiver section 12 when separated from sensor section 14. This feature enables receiver section 12 to be supported on any convenient horizontal surface (not shown) when detached or disconnected from sensor section 14.

Externally visible or accessible components of weather station 10 have been described thus far. Internal components and circuitry will now be described, with reference first to FIG. 9. A microprocessor 100 processes incoming data, stores historical data relating to weather, and manages the system by responding to control commands and issuing prompts where required and providing information to the user by visual and audible outputs. Historical data recorded for a selected immediate area of usage is stored in memory of a flash ROM 102. Microprocessor 100 may be a model 386 microprocessor by Intel Corporation, and flash ROM 102 may be model 28F400BX-T, also by Intel. A voice recognition and simulation system enables bidirectional vocal communication between weather station 10 and the user.

Incoming data is received either from sensor section 14 or by radio transmission from remote, external weather data broadcasting sources, as summarized in FIG. 1. Data derived by sensing is received by antenna 104 and communicated to conventional 49 MHz transmission and reception circuitry 106. Incoming signals are processed by a decoder and encoder 108, and are digitized within an analog-to-digital and digital-to-analog converter 110. Decoder and encoder 108 may be model HT12E/HT12D, by Holtek Corporation. Digitized data is then communicated to microprocessor 100 and flash ROM 102.

Incoming data received from external sources at 800 MHz frequency is processed as follows, referring now to FIG. 10. 800 MHz signals are received by antenna 112 and communicated to a duplex filter 114 which switches between transmission and reception functions. Duplex filter 114 may be model DFY2R836CR881BTJ, by Phillips Semiconductor. Data then passes to an 800 MHz receiver 116 and subsequently to a data processor 118 and to a microcontroller 120. Data processor 118 may be may be model UMA1000, as manufactured by Phillips Semiconductor, and microcontroller 120 may be model 8XC51RA, as manufactured by Intel. From microcontroller 120, data is passed to a flash ROM *or static ROM* 122 (see FIG. 9) and subsequently to microprocessor 100 (see FIG. 9).

Figure 10:
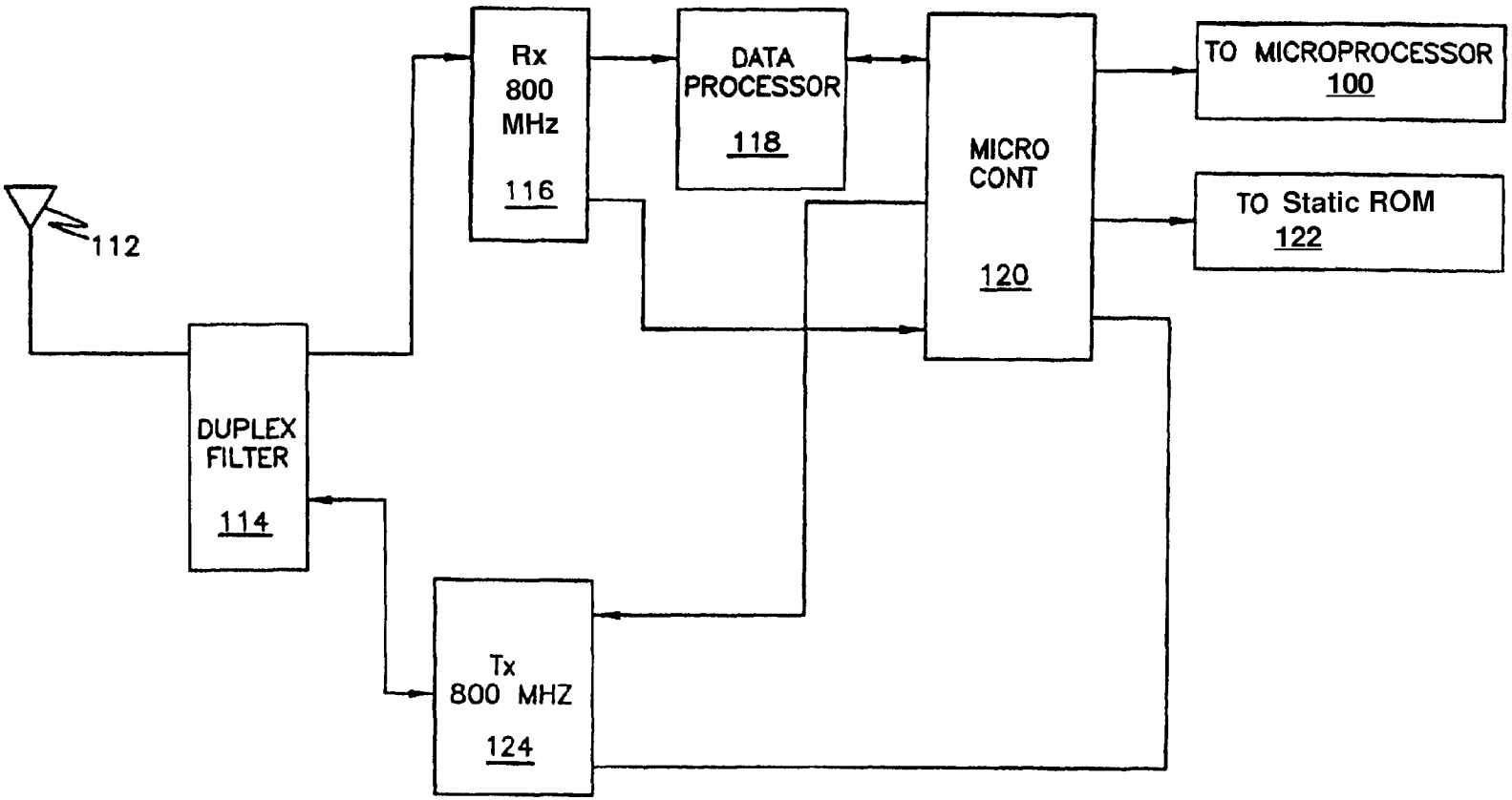
FIG. 10 is a diagram of internal data and signal processing components relating to 800 MHz frequency communications, and is an extension of the diagram of FIG. [10] *9*.

800 MHz transmissions by weather station 10 are enabled by a transmission module 124 incorporated into the 800 MHz circuitry shown in FIG. 10. Transmission module 124 may be model BGY110D.

Figure 11:
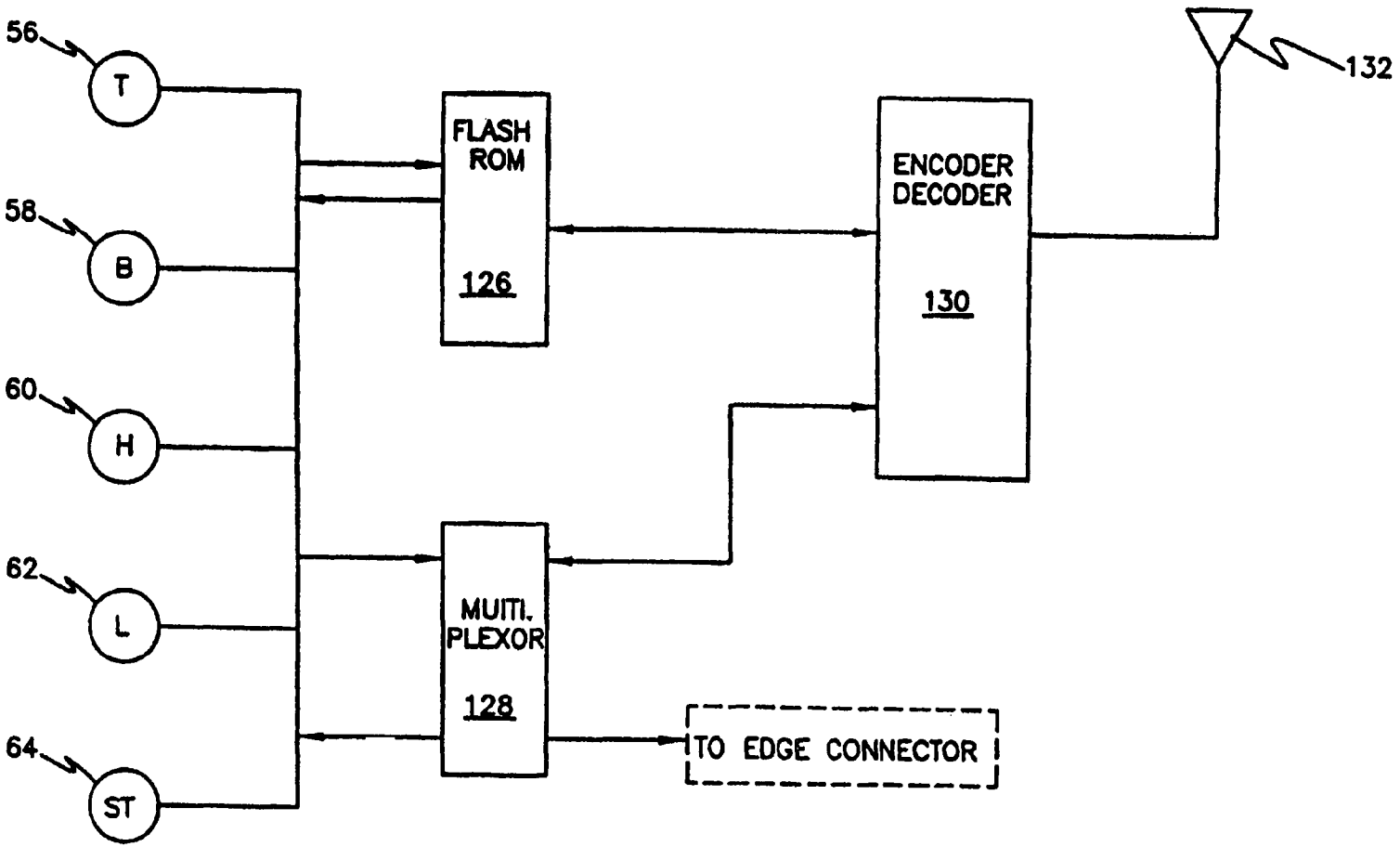
FIG. 11 is a diagram of internal data and signal processing components and associated interconnections of the sensor section.

Internal components of sensor section 14 are illustrated in FIG. 11. Sensors 56, 58, 60, 62, 64 communicate with a flash ROM 126 and with a multiplexer 128, which is connected to an encoder and decoder 130. Output of encoder and decoder 130 is transmitted by antenna 132 for reception by antenna 104 of receiving unit 12 (see FIG. 9). Antenna 132 is protected by gold mesh protector 73 shown in FIG. 4. Flash ROM 126 may be model 28F010-15, as manufactured by Intel, and multiplexer 128 may be a model 74151. Encoder and decoder 130 may be a model HT12E/HT12D, as manufactured by Holtek.

Because sections 12 and 14 are separable, each has an internal antenna 104 (see FIG. 9) or 132 for enabling mutual communication. With the exception of sensors 56, 58, 60, 62, 64, antenna 132 and its associated circuitry, and battery 67, all internal components described thus far are located in receiving section 12.

Figure 12:
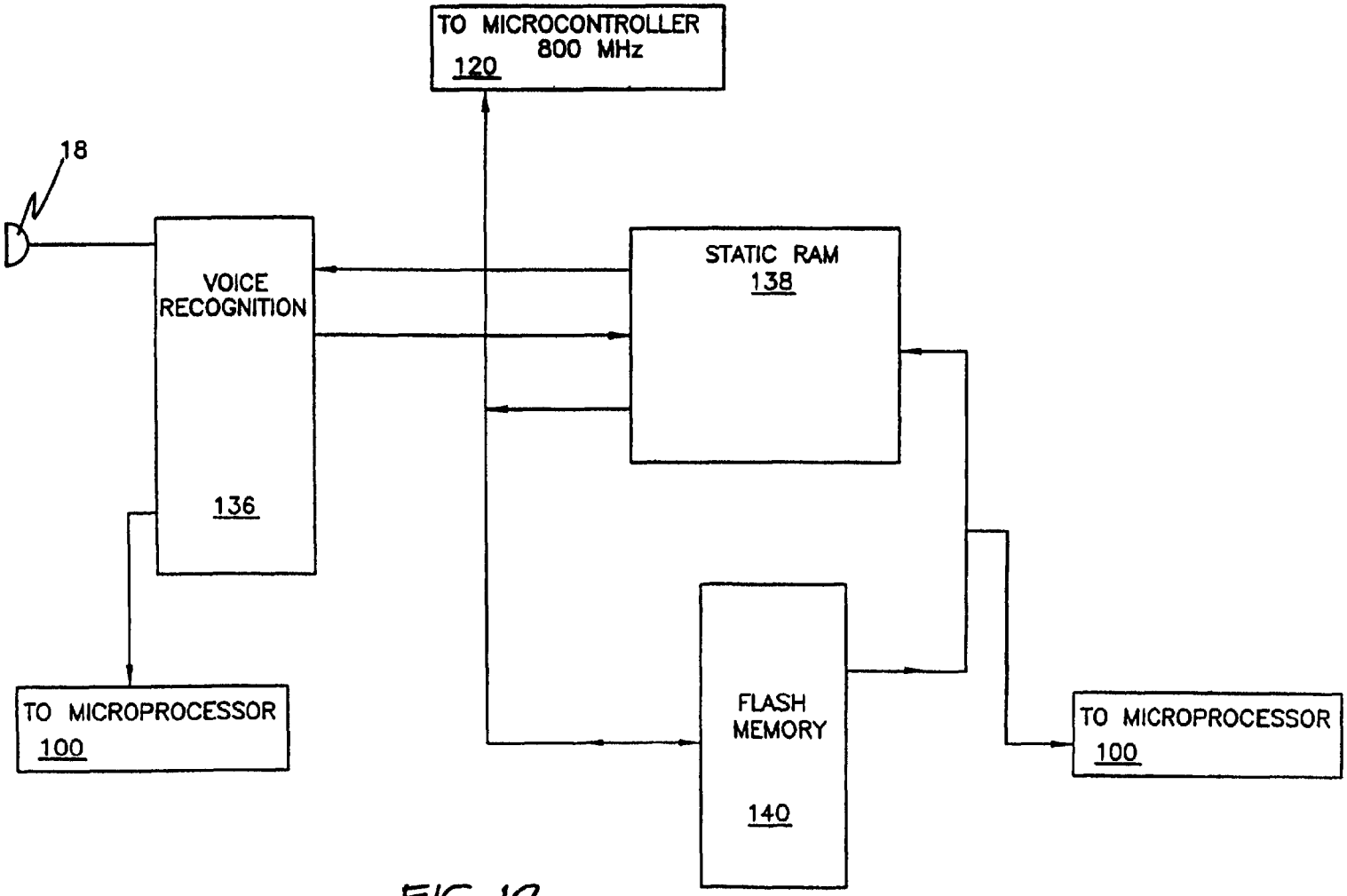
FIG. 12 is a diagram of voice recognition circuitry components and interconnections, and is an extension of the diagram of FIG. [10] *9*.

Referring now to FIG. 12, voice simulation and recognition apparatus is also contained within receiver section 12. voice recognition apparatus includes microphone 18 which is connected to a voice recognition device 136. Microphone 18 is located on receiver section 12 in any suitable location for receiving responses and commands spoken by the user. Device 136 is a model UPD 77501, as manufactured by NEC, and is a high quality speech recording and playback LSI. Device 136 communicates with a static RAM device 138 and a flash ROM memory device 140. Static RAM device 138 is preferably a 1 meg, 8 byte 128×8 RAM device, model MCM 6726, as manufactured by Motorola. Flash ROM device 140 is preferably a model 28F400BX-T, as manufactured by Intel.

Figure 9:
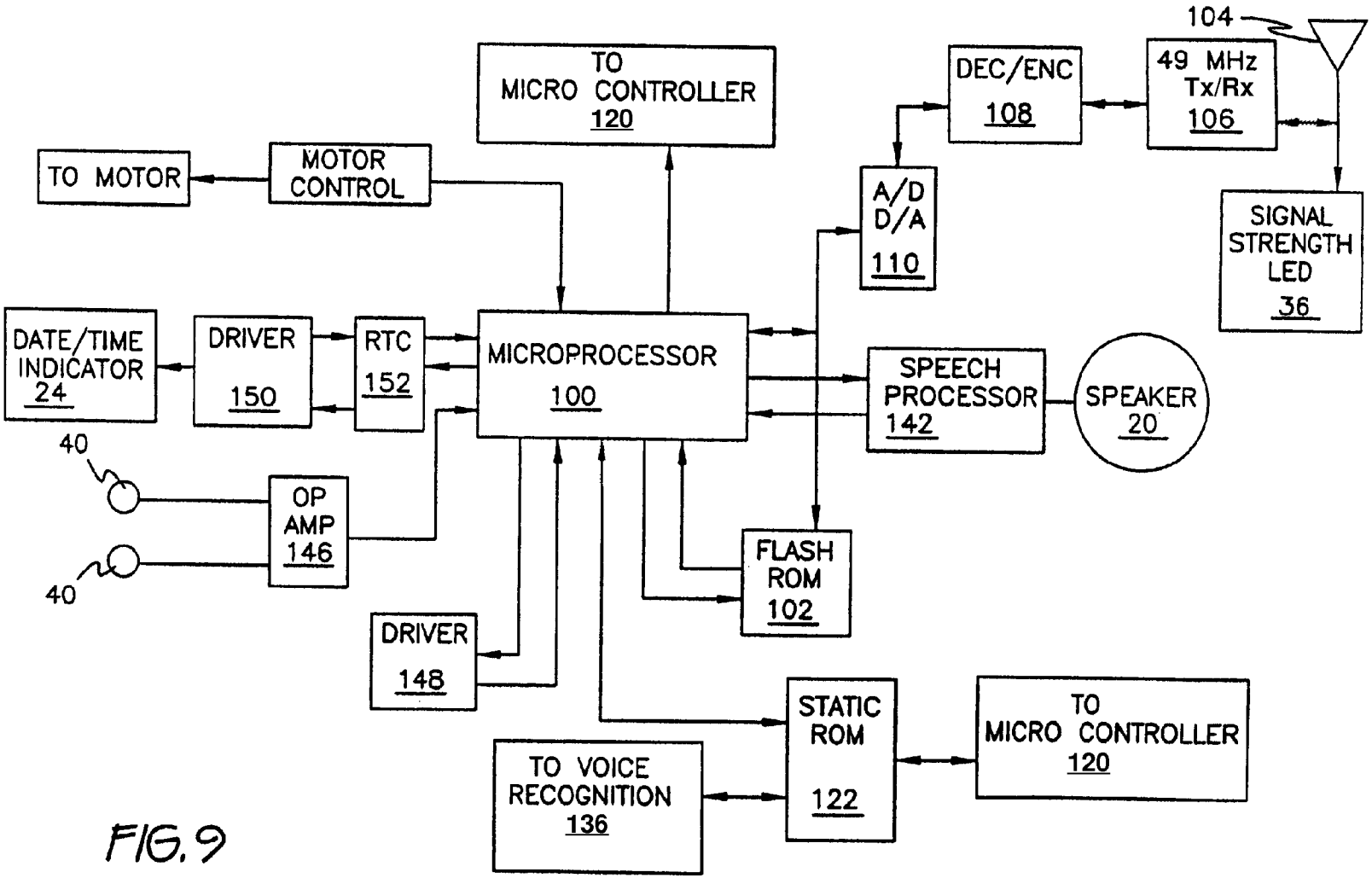
FIG. 9 is a diagram of internal data and signal processing components of the receiver section and their interconnections.

Voice simulation apparatus is shown in FIG. 9, and includes a 1 Megabyte speech data ROM integrated chip, or digital speech processor 142. Speech processor 142 is a stand alone masked ROM device, and is preferably a model 7758A, as manufactured by NEC. Output of speech processor 142 is projected from speaker 20.

Also shown in FIG. 9 are operative connection of proximity sensors 40 to microprocessor 100 through an operational amplifier 146, and drivers 148, 150 for driving visual indicators and alarm. Driver 150 is associated with a real time clock 152, and drives date and time indicator 24.

Figure 13:
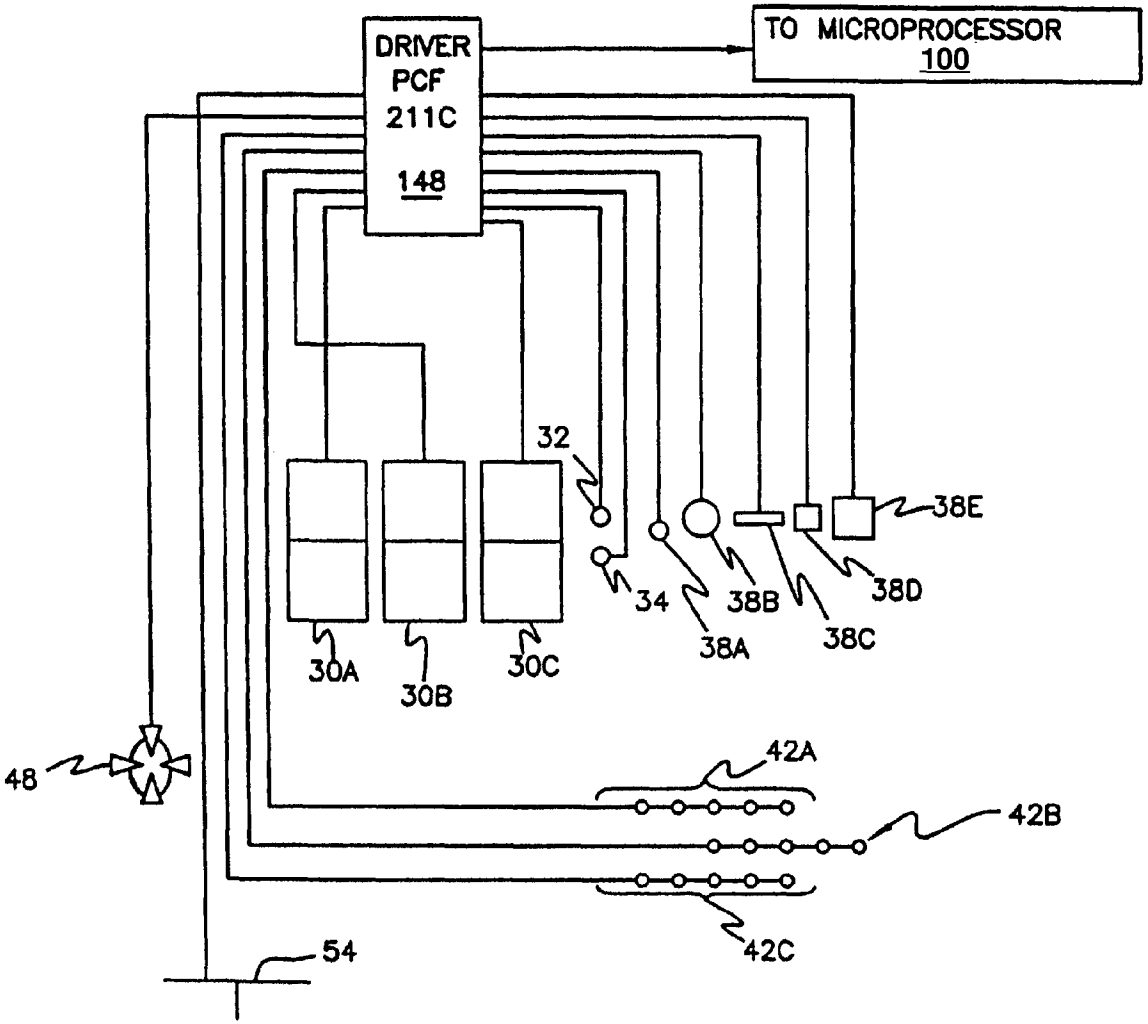
FIG. 13 is a diagram of a visual indicator driver and its driven indicators and interconnections therebetween, and is an extension of the diagram of FIG. [10] *9*.

Driver 148 drives many of the visual indicators disposed upon the front exterior surface of receiving section 12. These connections are shown in detail in FIG. 13. In FIG. 13, it will be seen that display 30 comprises three independent display panels 30A, 30B, and 30C, each capable of displaying a different symbol. Similarly, relative temperature display 38 indicates temperature in several individual steps or range increments by illuminating individual illuminable elements 38A, 38B, 38C, 38D, 38E.

Array 42 of LEDs comprises three independent groups of LEDS 42A, 42B, 42C. This array indicates mode of operation with respect to gathering of broadcast weather data relating to local weather (LEDs 42A), local continent (LEDs 42B), or international continent (LEDs 42C).

Operation of weather station 10 will now be described. Weather station 10 may be operated in any one of three modes. In a local reporting mode, weather station 10 reports conditions, either with sections 12 and 14 connected or separated. The local reporting mode is indicated by illumination of LEDs 42A. A local continent or country reporting mode is signalled by illumination of LEDs 42B. An international or global reporting mode is signalled by illumination of LEDs 42C. Local reporting may proceed with or without connection of sensor section 14. If connected and delivering data, LED 54 will illuminate.

To operate, it is required that switch 42 be on, that proximity sensors 40 detect a person disposed immediately in front of receiver section 12, and that an appropriate voice command or radio frequency signal be received. When the first two conditions are satisfied, reception of a radio signal indicative of severe weather conditions will initiate operation. Microprocessor 100 (see FIG. 9) is provided with a five year history of weather data for the geographic area selected to be monitored, and with algorithms for comparing input data to stored data to determine correlation to severe weather conditions. These weather conditions include tornadoes, high winds, lightning, high level of rainfall, among others. Correlation of input data with a severe weather condition will cause operation.

If no such correlation is received and the first two conditions for operation are present, a control algorithm will initiate a series of vocalized prompts generated by speech processor 142 and speaker 20 (see FIG. 9). When a verbal response is received, recognized, and correlated to predetermined responses by microphone 18 and associated voice recognition circuitry shown in FIG. 12, commands are executed and further verbal prompts, as appropriate, are generated.

One selection that is made by the user responsive to a prompt is the geographic area that is to be regarded as local. This information may be provided by the user verbally by responding with the latitude and longitude of the selected local area, or with a nearby city and state, according to initial programming of weather station 10.

Certain verbal prompts occur only during initial preparation of weather station 10, and are programmed such that once answered, they will not be repeated at each usage of weather station 10. These prompts concern language selection, as will be discussed hereinafter, and intervals and nature of audible alarms which sound automatically when microprocessor 100 determines that there is a high probability of severe weather conditions. A value relating to threshold of probability of severe conditions may also be included in prompts for initially preparing weather station 10.

When operating in the local reporting mode, sensors 56, 58, 60, 62, 64 periodically sense conditions and transmit collected data to microprocessor 100 for assessment of conditions and annunciation of the same. Routine information such as temperature is indicated on display 30 or relative temperature display 38, which indicates a range rather than specific values, as indicated on display 30. If severe conditions are calculated as probable, an audible alarm in the form of a high pitched tone or a simulated voice message in the selected language is sounded from speaker 20. After the user responds to predetermined verbal prompts to assure that correct selections are made, sensing becomes dormant and will reactivate at predetermined intervals, such as every fifteen minutes.

Memory of weather station 10 is loaded with data corresponding to a selected historic base time period, such as the previous five years. Real time weather data received by antenna 104 is reconfigured by digital-to-analog converter 110 and is routed to microprocessor 100 and to flash ROM 102. Analysis by comparison to known or pre-calculated conditions will generate outputs conducted to visual indicators shown in FIG. 2 and, if predetermined threshold values are met, sound an alarm as described above. In addition to an audible alarm, emergency indicator 48 will illuminate.

Voice recognition utilizes adaptive differential pulse code modulation (ADPCM). Speech processor 142 features low-pass filtering microphone amplifiers with a variable fixed gain ADPCM coder and decoder. Voice recognition device 136 receives a pulse code modulated signal from microphone 18. The signal is low pass filtered, converted to a ten bit digital value and converted to ADPCM. After conversion by the analog-to-digital converter 110, the signal is encoded to a shortened ADPCM code, such as two, three, or four bits. From the analysis circuit, the data is routed to external memory utilizing static RAM device 138 and associated flash ROM device 140. Data is retrieved when microprocessor addresses the voice recognition circuitry.

In the local reporting mode, LEDs 42A (see FIG. 13) will be illuminated. LED 38E is preferably red in color, and will indicate temperatures exceeding ninety degrees Fahrenheit. LED 38D is preferably amber in color, and indicates temperatures in a range of seventy to ninety degrees. LED 38C is preferably green in color, and indicates temperatures in a range of fifty to seventy degrees. LED 38B is preferably blue in color, and indicates temperatures in a range of thirty to fifty degrees. LED 38A is preferably red in color and indicates temperatures below thirty degrees Fahrenheit.

LED 54 will illuminate when the local reporting mode is in operation. This serves as warning that only local weather data is being reported.

To select a reporting mode, or to change an existing selection, switch 42 is switched to on, or switched to off followed by switching to on, if weather station 10 is already operating. Predetermined simulated voice prompts will request responses in a preselected code. This may comprise a letter or number corresponding to a particular selection, rather than a value or location being selected.

Language of communication is selected at this time. When a language prompt is answered in a preferred language, all responses by the user thereafter will be treated in the selected language, and all simulated voice prompts will be issued in the selected language. It is preferred that the memory of weather station 10 be loaded to include a range of languages for selection. Preferred languages include English, Spanish, German, French, Russian, Arabic, one or more Chinese dialects, Italian, and Japanese.

Within the U.S., NOAA Weather Radio is monitored for the standard 1050 Hz tone employed by the NOAA to indicate an emergency. Detection of this tone preferably triggers an appropriate alarm and may initiate a simulated vocal query to monitor specific severe conditions, such as identified existing hurricanes, tropical storms, and the like.

When selecting the international or global reporting mode, connection with the appropriate remote cellular protocol is arranged by prompts. Memory of weather station 10 is loaded with available international protocols to assure reception of the requested data.

After certain necessary selections have been made, weather station 10 will issue a general query as to other requirements not addressed by prompts. These may be specified by utilizing a prearranged code or signal.

When initial prompts have been satisfactorily answered, a vocal signal will be issued. Preferably, this signal will be a distinctive sound, such as the Boatswain's Whistle. The Boatswain's Whistle is a melody employed by the U.S. Naval Fleet.

It is to be understood that the present invention is not limited to the embodiments described above, but encompasses any and all embodiments within the scope of the following claims.

I claim:

[1. A weather station for monitoring weather conditions at at least one remote location comprising:

a detachable, portable, battery-powered and hand-holdable weather station unit situated at the at least one remote location including:

a microprocessor;

at least one data sensor coupled to the microprocessor for generating a data signal representative of weather conditions at the at least one remote location;

a transmitter coupled to the microprocessor for transmitting said data signal;

an antenna coupled to the transmitter, and a detachable, portable, battery powered and hand holdable weather station receiver for receiving and displaying the weather conditions received from said weather station unit.]

[2. The weather station of claim 1 wherein the data sensor monitors the weather data and wherein the transmitter is configured to wirelessly transmit a data signal, said data signal being representative of the weather data monitored at the at least one location.]

[3. The weather station of claim 1 wherein the data sensor senses temperature.]

[4. The weather station of claim 1 wherein the data sensor senses wind speed.]

[5. The weather station of claim 1 wherein the data sensor senses rain.]

[6. The weather station of claim 1 wherein the data sensor senses barometric pressure.]

[7. The weather station of claim 1 wherein the data sensor senses ambient light.]

[8. The weather station of claim 1 wherein the data sensor senses static charge.]

[9. The weather station of claim 1 wherein the data sensor senses humidity.]

[10. The weather station of claim 1 wherein the receiver comprises an indicating circuit configured to indicate a temperature trend.]

[11. The weather station of claim 1 wherein the receiver further comprises an alarm configured to indicate an alarm condition responsive to a comparison of the data signal received by the receiver with a predetermined threshold value.]

[12. The weather station of claim 1 wherein the receiver further comprises an indicating circuit configured to indicate a signal strength of the data signal being received by the receiver.]

[13. The weather station of claim 1 wherein the receiver is configured to receive a telemetry signal from a NOAA weather radio.]

[14. The weather station of claim 1 further comprising an alarm.]

[15. The weather station of claim 14 wherein the alarm is triggered when a probability of a predetermined weather condition is detected.]

[16. A weather station for monitoring weather conditions at at least one remote location comprising:

a portable, battery-powered and hand-holdable weather station unit situated at the at least one remote location including:

a microprocessor;

at least one data sensor coupled to the microprocessor for sensing at least one weather condition and generating a data signal representative of the at least one weather condition condition at the at least one remote location;

a transmitter coupled to the at least one data sensor for transmitting said data signal; and an antenna coupled to the transmitter, a portable, battery powered and hand holdable receiver configured to receive the data signal comprising:

a storage device configured to store at least one of a plurality of measured remote weather conditions;

a processor configured to generate a prediction of a weather condition, the prediction being based on the data signal received by the receiver and at least one of the measured weather conditions stored in the storage device; and an indicating circuit configured to indicate the prediction.]

[17. The weather station of claim 16 wherein the receiver further comprises an interface configured to receive a latitude coordinate.]

[18. The weather station of claim 16 wherein the receiver further comprises an interface configured to receive a longtitude coordinate.]

[19. The weather station of claim 16 wherein the receiver further comprises an interface configured to receive a geographic area latitude position.]

[20. The weather station of claim 16 wherein the receiver further comprises an interface configured to receive a geographic area longtitude position.]

[21. The weather station of claim 16 wherein the processor is coupled to the receiver and storage device and configured to generate a prediction of a potential remote weather condition, the prediction being based on the data signal received by the weather station receiver and at least one of the measured weather conditions compared to said stored data.]

[22. The weather station of claim 16 wherein the prediction of a weather condition is based on the received data signal and at least one of the measured weather conditions stored in the storage device.]

[23. The weather station of claim 16 wherein the indicating circuit is configured to indicate a temperature trend.]

[24. The weather station of claim 16 wherein the receiver further comprises an alarm configured to indicate an alarm condition responsive to a comparison of the data signal received by the receiver with a predetermined threshold value.]

[25. The weather station of claim 16 wherein the indicating circuit comprises a signal strength indicator configured to indicate a signal strength of the data signal being received by the receiver.]

[26. The weather station of claim 1 wherein the receiver is configured to receive a telemetry signal from a NOAA weather radio.]

[27. The weather station of claim 14 wherein the alarm is triggered when a predetermined weather condition is detected.]

[28. The weather station of claim 16 further comprising an alarm.]

[29. The weather station of claim 28 wherein the alarm is triggered when a predetermined weather condition is detected.]

[30. The weather station of claim 28 wherein the alarm is triggered when a probability of a predetermined weather condition is detected.]

*31. An apparatus comprising:*

*a readily portable, battery-powered and hand-holdable weather display unit including:*

*a first receiver configured for receiving data via a first radio frequency signal from a source;*

*a second receiver configured for receiving a second radio frequency signal from a cellular telephone network and compatible with an international cellular protocol, wherein the cellular telephone network is different than the source;*

*a display, including a prompt, and configured to display a date and a time;*

*a processing device configured for a) enabling display of information based on received data of at least one of the first radio frequency signal and the second radio frequency signal via the prompt, b) selecting between a first mode of operation that displays first weather conditions including temperature at a first location and a second mode of operation that displays second weather conditions at a second location different than the first location, c) and displaying a prediction of a future weather condition.*

*32. The apparatus of claim 31, wherein displaying the prediction of a future weather condition occurs during the display of the first weather conditions.*

*33. The apparatus of claim 31, wherein the prompt enables a location to be selected, the first weather conditions are weather conditions for the location, and at least one of the first weather conditions is based on the received data of the first radio frequency signal.*

*34. The apparatus of claim 31, wherein the international cellular protocol operates about a fixed frequency.*

*35. The apparatus of claim 31, further comprising:*

*a readily portable, battery-powered and hand-holdable weather station unit including:*

*at least one data sensor for generating a data signal representative of weather conditions at the at least one remote location; and*

*a transmitter for transmitting said data signal via the first radio frequency signal.*

*36. A portable weather station comprising:*

*(a) a portable, battery powered sensor unit, said sensor unit comprising a hand-holdable housing on or in which is provided:*

*a sensor for detecting a local area weather condition;*

*sensor unit circuitry for periodically sampling and wirelessly transmitting digital data of the local area weather condition sensed by said sensor; and*

*a battery power source for powering said sensor unit circuitry; and*

*(b) a portable, battery-powered weather station receiver unit, for use with said sensor unit when positioned in a general local area of said sensor unit, said weather station receiver unit including a hand-holdable housing on or in which is provided:*

*first radio frequency receiving circuitry for receiving, from said portable, battery powered sensor unit, said periodically sampled and wirelessly transmitted digital data of said local area weather condition;*

*second radio frequency receiving circuitry for receiving a separate wireless transmission of further digital data transmitted by a remote source which is relatively remotely located in relation to said sensor unit and weather station receiver unit;*

*at least one data storage device;*

*at least one visual display, for displaying numeric and other information-conveying symbols or indications;*

*microprocessor circuitry coupled to the first and second receiving circuits and said at least one data storage device, for receiving said digital data of said local area weather condition and said further digital data, for storing, in said at least one data storage device, said digital data of said local weather condition and said further digital data, and for outputting to said at least one visual display information of said digital data of said local weather condition and said further digital data; and*

*a battery power source for powering said weather station receiver unit.*

*37. A portable weather station according to claim 36, wherein said separate wireless transmission receivable by said second radio frequency circuitry comprises a transmission over a wireless network.*

*38. A portable weather station according to claim 36, wherein said microprocessor circuitry is configured to receive and process weather related data from the separate wireless transmission using a protocol compatible with the transmission, and for selecting weather information from a selected region on the globe, the microprocessor being further configured to process encoded weather data.*

*39. A portable weather station according to claim 36, said weather station receiver unit further comprising a user interface for selecting a mode of operation from a plurality of modes of operation, each mode of operation in the plurality of modes of operation defining different operating characteristics for the weather station receiver unit.*

*40. An apparatus comprising:*

*a readily portable, battery-powered and hand-holdable weather display unit including:*

*a first receiver configured for receiving weather conditions from a weather station unit;*

*a second receiver configured for receiving a signal from a remote source that is different than the weather station unit;*

*a circuit configured for receiving data indicating presence of a user at the weather display unit;*

*a display; and*

*a processing device configured to:*

*receive the weather conditions from the first receiver,*

*receive data representative of the signal from the second receiver,*

*receive the data indicating presence of a user at the weather display unit,*

*based on the data indicating presence of a user at the weather display unit, determine that the weather display unit is to operate in a mode that displays the weather conditions, and*

*in response to the determination, display the weather conditions.*

*41. The apparatus of claim 40, wherein display of a prediction of a future weather condition occurs during the display of the weather conditions.*

*42. The apparatus of claim 40, further comprising:*

*the weather station unit, wherein the weather station unit is configured to be readily portable, battery-powered and hand-holdable, and the weather station unit includes:*

*at least one data sensor for sensing the weather conditions; and*

*a transmitter for transmitting the weather conditions to the weather display unit via a digital signal.*

*43. An apparatus comprising:*

*a readily portable, battery-powered and hand-holdable weather display unit including:*

*a first receiver configured for receiving weather conditions from a weather station unit;*

*a second receiver configured for receiving a signal from a remote source that is different than the weather station unit;*

*a display including a prompt; and*

*a processing device configured to:*

*receive data representative of the signal from the second receiver,*

*receive data from a user of the weather display unit via the prompt, the received data indicating a selection of a location by the user;*

*identify the location based on the received data;*

*receive the weather conditions from the first receiver; and*

*display a weather prediction for the location based on the received weather conditions and the location.*

*44. The apparatus of claim 43, wherein the display of the weather prediction occurs during display of the weather conditions.*

*45. The apparatus of claim 43, further comprising:*

*the weather station unit, wherein the weather station unit is configured to be readily portable, battery-powered and hand-holdable, and the weather station unit includes:*

*at least one data sensor for sensing the weather conditions; and*

*a transmitter for transmitting the weather conditions to the weather display unit via a digital signal.*

*46. An apparatus comprising:*

*a readily portable, battery-powered and hand-holdable weather display unit including:*

*a first receiver configured for receiving weather conditions from a weather station unit;*

*a second receiver configured for receiving a signal from a remote source that is different than the weather station unit;*

*a display, including a prompt; and*

*a processing device configured to:*

*receive data representative of the signal from the second receiver,*

*receive the weather conditions from the first receiver,*

*receive location data, via the prompt, identifying a location,*

*subsequent to receiving the location data, receive historical weather condition data corresponding to the location,*

*determine a predicted weather condition by performing a correlation of the weather conditions and the historical weather data, and*

*display the predicted weather condition and one or more of the weather conditions.*

*47. The apparatus of claim 46, wherein displaying the predicted weather condition occurs during the display of the one or more of the weather conditions.*

*48. The apparatus of claim 46, further comprising:*

*the weather station unit, wherein the weather station unit is configured to be readily portable, battery-powered and hand-holdable, and the weather station unit includes:*

*at least one data sensor for sensing the weather conditions; and*

*a transmitter for transmitting the weather conditions to the weather display unit via a digital signal.*

*49. An apparatus comprising:*

*a readily portable, battery-powered and hand-holdable weather display unit including:*

*a first receiver configured for receiving weather conditions from a weather station unit, the weather conditions representing sensed weather conditions of a first location;*

*a second receiver configured for receiving a signal from a remote source that is different than the weather station unit;*

*a display;*

*a processing device configured to:*

*receive the weather conditions from the first receiver,*

*receive data representative of the signal from the second receiver,*

*select between a first mode of operation that displays the weather conditions received from the weather station unit and a second mode of operation that displays second weather conditions representative of conditions at a second location that is different than the first location, and*

*based on the selected mode of operation, display one or more weather conditions from at least one of the weather conditions received from the weather station unit and the second weather conditions.*

*50. An apparatus comprising:*

*a readily portable, battery-powered and hand-holdable unit comprising:*

*a first receiver configured for receiving data via a first radio frequency signal from a source;*

*a second receiver configured for receiving a second radio frequency signal from a cellular telephone network, wherein the cellular telephone network is different than the source;*

*a display configured to display a date and a time;*

*a processing device configured for a) enabling display of information based on received data of at least one of the first radio frequency signal and the second radio frequency signal, b) selecting between a first mode of operation that displays first weather conditions including temperature at a first location and a second mode of operation that displays second weather conditions at a second location different than the first location, c) and displaying a prediction of a future weather condition.*

* * * * *